United States Patent
Krishnan et al.

(10) Patent No.: US 11,664,547 B2
(45) Date of Patent: May 30, 2023

(54) MOISTURE AND CARBON DIOXIDE MANAGEMENT SYSTEM IN ELECTROCHEMICAL CELLS

(71) Applicant: FORM ENERGY, INC., Somerville, MA (US)

(72) Inventors: Ramkumar Krishnan, Scottsdale, AZ (US); Joel Hayes, Chandler, AZ (US); Shawn Fink, Sunnyvale, CA (US); Scott Klug, Mesa, AZ (US); Patrick Samuelson, Phoenix, AZ (US)

(73) Assignee: FORM ENERGY, INC., Somerville, MA (US)

( * ) Notice: Subject to any disclaimer, the term of this patent is extended or adjusted under 35 U.S.C. 154(b) by 86 days.

(21) Appl. No.: 17/245,614

(22) Filed: Apr. 30, 2021

(65) Prior Publication Data

US 2021/0249715 A1    Aug. 12, 2021

Related U.S. Application Data

(63) Continuation of application No. 16/318,513, filed as application No. PCT/US2017/043489 on Jul. 24, 2017, now Pat. No. 11,018,387.

(Continued)

(51) Int. Cl.
*H01M 12/02* (2006.01)
*H01M 12/08* (2006.01)
(Continued)

(52) U.S. Cl.
CPC ............. *H01M 12/02* (2013.01); *H01M 4/38* (2013.01); *H01M 8/04014* (2013.01);
(Continued)

(58) Field of Classification Search
CPC ......... H01M 8/04014; H01M 8/04037; H01M 8/04097; H01M 8/04104; H01M 8/04141;
(Continued)

(56) References Cited

U.S. PATENT DOCUMENTS 2,083,364 A    6/1937  Cook, Jr. et al.
2,643,276 A    6/1953  Jean et al.
(Continued)

FOREIGN PATENT DOCUMENTS

CN    1233861 A    11/1999
CN    1535489 A    10/2004
(Continued)

OTHER PUBLICATIONS

Office Action dated Jun. 3, 2021, issued in corresponding Chinese Patent Application No. 201780045371.3 with English translation (10 pgs ).

(Continued)

*Primary Examiner* — Amanda C. Walke
(74) *Attorney, Agent, or Firm* — The Marbury Law Group PLLC

(57) ABSTRACT

An electrochemical cell utilizes an air flow device that draws air through the cell from a scrubber that may be removed while the system is operating. The negative pressure generated by the air flow device allows ambient air to enter the cell housing when the scrubber is removed, thereby enabling continued operation without the scrubber. A moisture management system passes outflow air from the cell through a humidity exchange module that transfers moisture to the air inflow, thereby increasing the humidity of the air inflow. A recirculation feature comprising a valve allow a controller to recirculate at least a portion of the outflow air back into the inflow air. The system may comprise an inflow bypass conduit and valve that allows the humidified inflow air to (Continued)

pass into the cell inlet without passing through the scrubber. The scrubber may contain reversible or irreversible scrubber media.

22 Claims, 11 Drawing Sheets

Related U.S. Application Data

(60) Provisional application No. 62/365,866, filed on Jul. 22, 2016.

(51) Int. Cl.
*H01M 12/06* (2006.01)
*H01M 8/04119* (2016.01)
*H01M 8/04014* (2016.01)
*H01M 8/04007* (2016.01)
*H01M 4/38* (2006.01)
*H01M 8/04089* (2016.01)
*H01M 8/0668* (2016.01)

(52) U.S. Cl.
CPC ... *H01M 8/04037* (2013.01); *H01M 8/04097* (2013.01); *H01M 8/04104* (2013.01); *H01M 8/04141* (2013.01); *H01M 8/04149* (2013.01); *H01M 8/04179* (2013.01); *H01M 8/0668* (2013.01); *H01M 12/06* (2013.01); *H01M 12/08* (2013.01); *Y02E 60/10* (2013.01)

(58) Field of Classification Search
CPC ......... H01M 8/04149; H01M 8/04179; H01M 12/02
See application file for complete search history.

(56) References Cited

U.S. PATENT DOCUMENTS

| | | |
|---|---|---|
| 2,683,182 A | 7/1954 | Jean et al. |
| 3,219,486 A | 11/1965 | Salcedo et al. |
| 3,223,611 A | 12/1965 | Kergan et al. |
| 3,329,530 A | 7/1967 | Yutaka et al. |
| 3,338,746 A | 8/1967 | Gunther et al. |
| 3,363,570 A | 1/1968 | Scott |
| 3,415,689 A | 12/1968 | Carson, Jr. et al. |
| 3,483,036 A | 12/1969 | Gregor et al. |
| 3,484,291 A | 12/1969 | MacKenzie, Jr. et al. |
| 3,489,610 A | 1/1970 | Berger et al. |
| 3,525,643 A | 8/1970 | Spahrbier et al. |
| 3,532,548 A | 10/1970 | Stachurski et al. |
| 3,615,843 A | 10/1971 | Moran |
| 3,615,844 A | 10/1971 | Spengler |
| 3,650,837 A | 3/1972 | Palmer |
| 3,686,225 A | 8/1972 | Pedersen et al. |
| 3,713,892 A | 1/1973 | Moran |
| 3,716,413 A | 2/1973 | Eisner |
| 3,717,505 A | 2/1973 | Unkle, Jr. et al. |
| 3,728,244 A | 4/1973 | Cooley et al. |
| 3,785,868 A | 1/1974 | Devitt |
| 3,801,376 A | 4/1974 | Lindstrom |
| 3,822,149 A | 7/1974 | Hale et al. |
| 3,840,455 A | 10/1974 | Cooley et al. |
| 3,847,603 A | 11/1974 | Fukuda et al. |
| 3,850,696 A | 11/1974 | Summers et al. |
| 3,886,426 A | 5/1975 | Daggett |
| 3,888,877 A | 6/1975 | Lehn |
| 3,902,916 A | 9/1975 | Warszawski |
| 3,919,062 A | 11/1975 | Lundquist, Jr. et al. |
| 3,945,849 A | 3/1976 | Hoffman |
| 3,947,292 A | 3/1976 | Jackovitz et al. |
| 3,965,116 A | 6/1976 | Cram |
| 3,966,766 A | 6/1976 | Lehn |
| 3,972,727 A | 8/1976 | Cohn |
| 4,001,212 A | 1/1977 | Richman |
| 4,001,279 A | 1/1977 | Cram |
| 4,007,059 A | 2/1977 | Witherspoon et al. |
| 4,054,725 A | 10/1977 | Tuburaya |
| 4,076,600 A | 2/1978 | Huebner |
| 4,117,205 A | 9/1978 | Kitai |
| 4,119,772 A | 10/1978 | Peters et al. |
| 4,132,837 A | 1/1979 | Soffer |
| 4,139,679 A | 2/1979 | Appleby et al. |
| 4,168,349 A | 9/1979 | Buzzelli |
| 4,201,653 A | 5/1980 | O'Neill et al. |
| 4,246,324 A | 1/1981 | De et al. |
| 4,250,236 A | 2/1981 | Haschka et al. |
| 4,265,789 A | 5/1981 | Christopherson et al. |
| 4,312,927 A | 1/1982 | Salmon |
| 4,317,863 A | 3/1982 | Struthers |
| 4,331,460 A | 5/1982 | Dillmann et al. |
| 4,336,043 A | 6/1982 | Aonuma et al. |
| 4,340,449 A | 7/1982 | Srinivasan et al. |
| 4,369,235 A | 1/1983 | Bursell |
| 4,375,427 A | 3/1983 | Miller et al. |
| 4,384,928 A | 5/1983 | Hall |
| 4,385,101 A | 5/1983 | Catanzarite |
| 4,385,967 A | 5/1983 | Brady et al. |
| 4,386,141 A | 5/1983 | Weidner et al. |
| 4,447,504 A | 5/1984 | Goebel |
| 4,448,858 A | 5/1984 | Graf et al. |
| 4,450,211 A | 5/1984 | Vignaud |
| 4,461,817 A | 7/1984 | Itoh et al. |
| 4,479,856 A | 10/1984 | Ando |
| 4,484,936 A | 11/1984 | Sakai |
| 4,485,154 A | 11/1984 | Remick et al. |
| 4,487,818 A | 12/1984 | Ovshinsky et al. |
| 4,521,497 A | 6/1985 | Tamminen |
| 4,535,039 A | 8/1985 | Naarmann et al. |
| 4,552,630 A | 11/1985 | Wheeler et al. |
| 4,581,064 A | 4/1986 | Morrison et al. |
| 4,585,710 A | 4/1986 | McEvoy |
| 4,605,626 A | 8/1986 | Beck |
| 4,670,363 A | 6/1987 | Whitney et al. |
| 4,684,585 A | 8/1987 | Tamminen |
| 4,693,946 A | 9/1987 | Niksa et al. |
| 4,732,823 A | 3/1988 | Ito et al. |
| 4,765,799 A | 8/1988 | Waldrop |
| 4,828,942 A | 5/1989 | Licht |
| 4,842,963 A | 6/1989 | Ross, Jr. |
| 4,869,979 A | 9/1989 | Ohtani et al. |
| 4,871,627 A | 10/1989 | Strong et al. |
| 4,894,355 A | 1/1990 | Takeuchi et al. |
| 4,952,289 A | 8/1990 | Ciccone et al. |
| 4,977,044 A | 12/1990 | Ludwig |
| 5,009,755 A | 4/1991 | Shor |
| 5,011,747 A | 4/1991 | Strong et al. |
| 5,041,194 A | 8/1991 | Mori et al. |
| 5,093,213 A | 3/1992 | O'Callaghan |
| 5,104,497 A | 4/1992 | Tetzlaff et al. |
| 5,130,211 A | 7/1992 | Wilkinson et al. |
| 5,131,387 A | 7/1992 | French et al. |
| 5,145,752 A | 9/1992 | Goldstein et al. |
| 5,185,218 A | 2/1993 | Brokman et al. |
| 5,188,914 A | 2/1993 | Blomgren et al. |
| 5,190,833 A | 3/1993 | Goldstein et al. |
| 5,200,057 A | 4/1993 | Canaris |
| 5,242,763 A | 9/1993 | Konishi et al. |
| 5,242,765 A | 9/1993 | Naimer et al. |
| 5,284,176 A | 2/1994 | Campau |
| 5,318,861 A | 6/1994 | Harats et al. |
| 5,376,471 A | 12/1994 | Hunter et al. |
| 5,397,532 A | 3/1995 | Blaimschein |
| 5,411,815 A | 5/1995 | Goldstein |
| 5,415,949 A | 5/1995 | Stone et al. |
| 5,419,987 A | 5/1995 | Goldstein et al. |
| 5,431,823 A | 7/1995 | Gofer |
| 5,432,022 A | 7/1995 | Cheiky |
| 5,434,020 A | 7/1995 | Cooper |
| 5,439,758 A | 8/1995 | Stone et al. |
| 5,441,820 A | 8/1995 | Siu et al. |
| 5,445,724 A | 8/1995 | Burkhart et al. |
| 5,451,475 A | 9/1995 | Ohta et al. |

(56) References Cited

U.S. PATENT DOCUMENTS

| | | | |
|---|---|---|---|
| 5,453,334 | A | 9/1995 | Melichar |
| 5,458,988 | A | 10/1995 | Putt |
| 5,506,067 | A | 4/1996 | Tinker |
| 5,512,391 | A | 4/1996 | Fleischer |
| 5,549,991 | A | 8/1996 | Licht et al. |
| 5,567,540 | A | 10/1996 | Stone et al. |
| 5,569,551 | A | 10/1996 | Pedicini et al. |
| 5,569,560 | A | 10/1996 | Olsen et al. |
| 5,595,949 | A | 1/1997 | Goldstein et al. |
| 5,645,952 | A | 7/1997 | Lampinen et al. |
| 5,650,240 | A | 7/1997 | Rogers |
| 5,652,068 | A | 7/1997 | Shuster et al. |
| 5,665,481 | A | 9/1997 | Shuster et al. |
| 5,700,596 | A | 12/1997 | Ikoma et al. |
| 5,707,757 | A | 1/1998 | Lee |
| 5,712,061 | A | 1/1998 | Spak et al. |
| 5,716,726 | A | 2/1998 | Cheiky |
| 5,731,105 | A | 3/1998 | Fleischer et al. |
| 5,733,667 | A | 3/1998 | Nakasuji et al. |
| 5,788,943 | A | 8/1998 | Aladjov |
| 5,789,585 | A | 8/1998 | Lee et al. |
| 5,840,443 | A | 11/1998 | Gregg et al. |
| 5,850,136 | A | 12/1998 | Kaneko |
| 5,935,724 | A | 8/1999 | Spillman et al. |
| 5,935,728 | A | 8/1999 | Spillman et al. |
| 5,938,899 | A | 8/1999 | Forand |
| 5,972,531 | A | 10/1999 | Kawakami |
| 5,990,352 | A | 11/1999 | Nobori et al. |
| 5,998,967 | A | 12/1999 | Umeki et al. |
| 6,014,013 | A | 1/2000 | Suppanz et al. |
| 6,025,696 | A | 2/2000 | Lenhart et al. |
| 6,034,506 | A | 3/2000 | Hall |
| 6,046,514 | A | 4/2000 | Rouillard et al. |
| 6,054,840 | A | 4/2000 | Nakanishi et al. |
| 6,057,052 | A | 5/2000 | Shrim et al. |
| 6,091,230 | A | 7/2000 | Winzer |
| 6,120,941 | A | 9/2000 | Lee et al. |
| 6,127,061 | A | 10/2000 | Shun et al. |
| 6,153,328 | A | 11/2000 | Colborn |
| 6,162,333 | A | 12/2000 | Lemon et al. |
| 6,162,555 | A | 12/2000 | Gutierrez et al. |
| 6,164,309 | A | 12/2000 | Brecht |
| 6,165,638 | A | 12/2000 | Spillman et al. |
| 6,194,098 | B1 | 2/2001 | Ying et al. |
| 6,207,037 | B1 | 3/2001 | Dartnell et al. |
| 6,210,832 | B1 | 4/2001 | Visco et al. |
| 6,211,650 | B1 | 4/2001 | Mumaw et al. |
| 6,228,535 | B1 | 5/2001 | Fierro et al. |
| 6,249,940 | B1 | 6/2001 | Asano et al. |
| 6,265,846 | B1 | 7/2001 | Flechsig et al. |
| 6,268,085 | B1 | 7/2001 | Manthiram et al. |
| 6,271,646 | B1 | 8/2001 | Evers et al. |
| 6,277,508 | B1 | 8/2001 | Reiser et al. |
| 6,300,015 | B1 | 10/2001 | Nishiyama et al. |
| 6,312,846 | B1 | 11/2001 | Marsh |
| 6,355,369 | B1 | 3/2002 | Iarochenko et al. |
| 6,358,643 | B1 | 3/2002 | Katz et al. |
| 6,368,741 | B1 | 4/2002 | Hackel et al. |
| 6,371,995 | B1 | 4/2002 | Yasunami |
| 6,379,828 | B1 | 4/2002 | Worth |
| 6,383,673 | B1 | 5/2002 | Faris et al. |
| 6,383,675 | B1 | 5/2002 | Zhong |
| 6,410,174 | B1 | 6/2002 | Faris |
| 6,416,649 | B1 | 7/2002 | Ray et al. |
| 6,458,480 | B1 | 10/2002 | Morris et al. |
| 6,465,638 | B2 | 10/2002 | Gorman et al. |
| 6,465,643 | B1 | 10/2002 | Schiemenz et al. |
| 6,472,093 | B2 | 10/2002 | Faris et al. |
| 6,475,658 | B1 | 11/2002 | Pedicini et al. |
| 6,537,701 | B1 | 3/2003 | Nimon et al. |
| 6,541,151 | B2 | 4/2003 | Minamiura et al. |
| 6,541,941 | B2 | 4/2003 | Adams et al. |
| 6,544,678 | B2 | 4/2003 | Faris et al. |
| 6,558,830 | B2 | 5/2003 | Faris et al. |
| 6,562,494 | B1 | 5/2003 | Tsai et al. |
| 6,562,504 | B2 | 5/2003 | Faris et al. |
| 6,566,000 | B1 | 5/2003 | Iarochenko et al. |
| 6,569,555 | B1 | 5/2003 | Faris et al. |
| 6,579,637 | B1 | 6/2003 | Savage et al. |
| 6,586,909 | B1 | 7/2003 | Trepka |
| 6,641,943 | B1 | 11/2003 | Faris et al. |
| 6,645,904 | B2 | 11/2003 | Schiemenz et al. |
| 6,646,418 | B1 | 11/2003 | Xie et al. |
| 6,649,294 | B2 | 11/2003 | Faris et al. |
| 6,653,252 | B2 | 11/2003 | Kawahara |
| 6,666,909 | B1 | 12/2003 | TeGrotenhuis et al. |
| 6,673,490 | B2 | 1/2004 | Miki et al. |
| 6,677,077 | B2 | 1/2004 | Spillman et al. |
| 6,706,433 | B2 | 3/2004 | Pinto et al. |
| 6,713,206 | B2 | 3/2004 | Markoski et al. |
| 6,756,149 | B2 | 6/2004 | Knights et al. |
| 6,762,587 | B1 | 7/2004 | Barbetta |
| 6,764,588 | B2 | 7/2004 | Smedley et al. |
| 6,776,929 | B2 | 8/2004 | Hossan et al. |
| 6,786,226 | B2 | 9/2004 | Crook et al. |
| 6,787,260 | B2 | 9/2004 | Smedley |
| 6,790,265 | B2 | 9/2004 | Joshi et al. |
| 6,802,946 | B2 | 10/2004 | Basol et al. |
| 6,811,819 | B2 | 11/2004 | Joshi et al. |
| 6,811,903 | B2 | 11/2004 | Vartak et al. |
| 6,822,423 | B2 | 11/2004 | Yau et al. |
| 6,838,203 | B2 | 1/2005 | Zheng |
| 6,849,172 | B2 | 2/2005 | Rigby et al. |
| 6,849,356 | B2 | 2/2005 | Dow et al. |
| 6,855,455 | B1 | 2/2005 | Berger et al. |
| 6,858,347 | B2 | 2/2005 | Tanigawa et al. |
| 6,866,950 | B2 | 3/2005 | Connor et al. |
| 6,899,974 | B2 | 5/2005 | Kamisuki et al. |
| 6,902,602 | B2 | 6/2005 | Keefer et al. |
| 6,911,274 | B1 | 6/2005 | Colborn et al. |
| 6,942,105 | B2 | 9/2005 | Smedley et al. |
| 6,949,310 | B2 | 9/2005 | Phillips |
| 6,962,992 | B2 | 11/2005 | Martin et al. |
| 6,967,064 | B2 | 11/2005 | Haltiner, Jr. et al. |
| 6,986,964 | B2 | 1/2006 | Faris |
| 7,020,355 | B2 | 3/2006 | Lahann et al. |
| 7,040,431 | B2 | 5/2006 | Tartamella et al. |
| 7,060,388 | B2 | 6/2006 | Naruoka |
| 7,070,632 | B1 | 7/2006 | Visco et al. |
| 7,126,310 | B1 | 10/2006 | Barron |
| 7,150,933 | B1 | 12/2006 | McLean |
| 7,201,857 | B2 | 4/2007 | Ovshinsky et al. |
| 7,226,676 | B2 | 6/2007 | Faris et al. |
| 7,238,440 | B2 | 7/2007 | Damore et al. |
| 7,252,898 | B2 | 8/2007 | Markoski et al. |
| 7,270,906 | B2 | 9/2007 | Haltiner, Jr. et al. |
| 7,273,541 | B2 | 9/2007 | Choban et al. |
| 7,276,309 | B2 | 10/2007 | Smedley et al. |
| 7,279,245 | B1 | 10/2007 | Clark |
| 7,285,362 | B2 | 10/2007 | Harrup et al. |
| 7,291,186 | B2 | 11/2007 | Zhang |
| 7,303,835 | B2 | 12/2007 | Mathias et al. |
| 7,466,104 | B2 | 12/2008 | Wang et al. |
| 7,468,221 | B2 | 12/2008 | LaFollette et al. |
| 7,482,081 | B2 | 1/2009 | Hong |
| 7,488,547 | B1 | 2/2009 | Iacovelli |
| 7,535,199 | B2 | 5/2009 | Kimura et al. |
| 7,556,056 | B2 | 7/2009 | Hutchinson |
| 7,598,796 | B2 | 10/2009 | Mizuno et al. |
| 7,670,575 | B2 | 3/2010 | Jarvinen et al. |
| 7,670,705 | B2 | 3/2010 | Ueda |
| 7,670,724 | B1 | 3/2010 | Chan et al. |
| 7,722,988 | B2 | 5/2010 | Webber |
| 7,794,582 | B1 | 9/2010 | Cook et al. |
| 7,964,300 | B2 | 6/2011 | Nakazawa et al. |
| 7,997,425 | B2 | 8/2011 | Golden et al. |
| 3,058,165 | A1 | 11/2011 | Kawano et al. |
| 8,168,337 | B2 | 5/2012 | Friesen et al. |
| 8,309,259 | B2 | 11/2012 | Friesen et al. |
| 8,329,346 | B2 | 12/2012 | Janse et al. |
| 8,397,508 | B2 | 3/2013 | Weimer et al. |
| 8,481,207 | B2 | 7/2013 | Friesen et al. |
| 8,491,763 | B2 | 7/2013 | Friesen et al. |
| 8,492,052 | B2 | 7/2013 | Friesen et al. |

(56) References Cited

U.S. PATENT DOCUMENTS

| | | |
|---|---|---|
| 8,632,921 B2 | 1/2014 | Friesen et al. |
| 8,659,268 B2 | 2/2014 | Krishnan et al. |
| 8,758,948 B2 | 6/2014 | Narayan et al. |
| 8,877,391 B2 | 11/2014 | Friesen et al. |
| 8,895,197 B2 | 11/2014 | Friesen et al. |
| 8,906,563 B2 | 12/2014 | Friesen et al. |
| 8,911,910 B2 | 12/2014 | Krishnan et al. |
| 9,065,120 B2 | 6/2015 | Carlson |
| 9,105,910 B2 | 8/2015 | Friesen et al. |
| 9,105,946 B2 | 8/2015 | Friesen et al. |
| 9,172,123 B2 | 10/2015 | Albertus et al. |
| 9,178,207 B2 | 11/2015 | Friesen et al. |
| 9,214,708 B2 | 12/2015 | Friesen et al. |
| 9,263,779 B2 | 2/2016 | Lee et al. |
| 9,269,995 B2 | 2/2016 | Friesen et al. |
| 9,269,996 B2 | 2/2016 | Friesen et al. |
| 9,269,998 B2 | 2/2016 | Hayes et al. |
| 9,368,486 B2 | 6/2016 | Wang et al. |
| 9,368,788 B2 | 6/2016 | Ogg et al. |
| 9,419,273 B2 | 8/2016 | Kakeya et al. |
| 9,478,806 B2 | 10/2016 | Ogg et al. |
| 9,537,144 B2 | 1/2017 | Huang et al. |
| 9,559,385 B2 | 1/2017 | Ogg et al. |
| 9,577,298 B2 | 2/2017 | Narayan et al. |
| 9,583,779 B2 | 2/2017 | Chiang et al. |
| 9,660,265 B2 | 5/2017 | Visco et al. |
| 9,680,151 B2 | 6/2017 | Mullins et al. |
| 9,680,154 B2 | 6/2017 | Chen et al. |
| 9,780,379 B2 | 10/2017 | Zhamu et al. |
| 9,843,064 B2 | 12/2017 | Brandon et al. |
| 9,893,397 B2 | 2/2018 | Yoshida et al. |
| 9,911,985 B2 | 3/2018 | Dong et al. |
| 9,947,481 B2 | 4/2018 | Solomon et al. |
| 10,008,754 B2 | 6/2018 | Englert |
| 10,014,530 B2 | 7/2018 | Lang et al. |
| 10,033,036 B2 | 7/2018 | Christensen et al. |
| 10,044,082 B2 | 8/2018 | Suyama et al. |
| 10,147,988 B2 | 12/2018 | Park et al. |
| 10,177,426 B2 | 1/2019 | Nitta |
| 10,530,001 B2 | 1/2020 | Finkelshtain et al. |
| 11,228,066 B2 | 1/2022 | Krishnan et al. |
| 2001/0007725 A1 | 7/2001 | Faris et al. |
| 2002/0015871 A1 | 2/2002 | Tao et al. |
| 2002/0028372 A1 | 3/2002 | Ohlsen et al. |
| 2002/0045075 A1 | 4/2002 | Pinto et al. |
| 2002/0076602 A1 | 6/2002 | Finkelshtain et al. |
| 2002/0098398 A1 | 7/2002 | Chen |
| 2002/0142203 A1 | 10/2002 | Ma et al. |
| 2002/0155351 A1 | 10/2002 | Licht |
| 2003/0054217 A1 | 3/2003 | Faris |
| 2003/0077501 A1 | 4/2003 | Knights et al. |
| 2003/0099882 A1 | 5/2003 | Hampden-Smith et al. |
| 2003/0134163 A1 | 7/2003 | Markoski et al. |
| 2003/0143446 A1 | 7/2003 | Faris et al. |
| 2003/0165727 A1 | 9/2003 | Priestnall et al. |
| 2003/0190504 A1 | 10/2003 | Fisher et al. |
| 2003/0198862 A1 | 10/2003 | Struthers |
| 2004/0005488 A1 | 1/2004 | Faris et al. |
| 2004/0023112 A1 | 2/2004 | Lin |
| 2004/0029723 A1 | 2/2004 | Schiemenz et al. |
| 2004/0031251 A1 | 2/2004 | Priess |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0058226 A1 | 3/2004 | Lamarre et al. |
| 2004/0086779 A1 | 5/2004 | Higley et al. |
| 2004/0104124 A1 | 6/2004 | Cobley et al. |
| 2004/0110049 A1 | 6/2004 | Shimotori et al. |
| 2004/0121208 A1 | 6/2004 | James et al. |
| 2004/0146764 A1 | 7/2004 | Tsai et al. |
| 2004/0157092 A1 | 8/2004 | Kimberg et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185323 A1 | 9/2004 | Fowler et al. |
| 2004/0185328 A1 | 9/2004 | Lin et al. |
| 2004/0221426 A1 | 11/2004 | Igawa et al. |
| 2004/0225249 A1 | 11/2004 | Leonard et al. |
| 2004/0229107 A1 | 11/2004 | Smedley |
| 2004/0247969 A1 | 12/2004 | Faris et al. |
| 2005/0019634 A1 | 1/2005 | Legg |
| 2005/0019651 A1 | 1/2005 | Tsai et al. |
| 2005/0031911 A1 | 2/2005 | Venkatesan et al. |
| 2005/0042503 A1 | 2/2005 | Kim et al. |
| 2005/0084737 A1 | 4/2005 | Wine et al. |
| 2005/0105229 A1 | 5/2005 | Deng et al. |
| 2005/0123815 A1 | 6/2005 | Tsai et al. |
| 2005/0142398 A1 | 6/2005 | Browall et al. |
| 2005/0170245 A1 | 8/2005 | Vartak et al. |
| 2005/0196656 A1 | 9/2005 | Gomez |
| 2005/0208343 A1 | 9/2005 | Kim et al. |
| 2005/0233191 A1 | 10/2005 | Ushio |
| 2006/0003217 A1 | 1/2006 | Cohen et al. |
| 2006/0024551 A1 | 2/2006 | Smotkin |
| 2006/0038536 A1 | 2/2006 | LaFollette et al. |
| 2006/0039853 A1 | 2/2006 | Fan et al. |
| 2006/0040174 A1 | 2/2006 | Peabody |
| 2006/0076295 A1 | 4/2006 | Leonard et al. |
| 2006/0107639 A1 | 5/2006 | Hamlin et al. |
| 2006/0127731 A1 | 6/2006 | Faris |
| 2006/0175720 A1 | 8/2006 | Kerfoot |
| 2006/0194107 A1 | 8/2006 | Licht |
| 2006/0210867 A1 | 9/2006 | Kenis et al. |
| 2006/0228622 A1 | 10/2006 | Cohen et al. |
| 2006/0234855 A1 | 10/2006 | Gorte et al. |
| 2006/0269826 A1 | 11/2006 | Katz et al. |
| 2006/0281000 A1 | 12/2006 | Hayashigawa |
| 2006/0292407 A1 | 12/2006 | Gervasio et al. |
| 2007/0020496 A1 | 1/2007 | Pelton et al. |
| 2007/0048577 A1 | 3/2007 | Ringeisen et al. |
| 2007/0077491 A1 | 4/2007 | Burghardt |
| 2007/0092787 A1 | 4/2007 | Wang Chen |
| 2007/0099037 A1 | 5/2007 | Senner |
| 2007/0120091 A1 | 5/2007 | Ovshinsky et al. |
| 2007/0134527 A1 | 6/2007 | Desouza et al. |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141440 A1 | 6/2007 | Yang et al. |
| 2007/0141450 A1 | 6/2007 | Yang et al. |
| 2007/0154766 A1 | 7/2007 | Baik et al. |
| 2007/0166602 A1 | 7/2007 | Burghardt |
| 2007/0184314 A1 | 8/2007 | Kagami |
| 2007/0224500 A1 | 9/2007 | White et al. |
| 2007/0234900 A1 | 10/2007 | Soloveichik et al. |
| 2007/0237993 A1 | 10/2007 | Carlsson et al. |
| 2007/0248845 A1 | 10/2007 | Armstrong et al. |
| 2007/0248868 A1 | 10/2007 | Haltiner, Jr. et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2007/0283811 A1 | 12/2007 | Wu |
| 2007/0287034 A1 | 12/2007 | Minteer et al. |
| 2008/0008911 A1 | 1/2008 | Stroock et al. |
| 2008/0009780 A1 | 1/2008 | Leonard et al. |
| 2008/0026265 A1 | 1/2008 | Markoski et al. |
| 2008/0032170 A1 | 2/2008 | Wainright et al. |
| 2008/0044721 A1 | 2/2008 | Heller et al. |
| 2008/0118826 A1 | 5/2008 | Shimamura et al. |
| 2008/0131762 A1 | 6/2008 | Joo et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2008/0154101 A1 | 6/2008 | Jain et al. |
| 2008/0231231 A1 | 9/2008 | Hartzog |
| 2008/0241617 A1 | 10/2008 | Sato |
| 2008/0252257 A1 | 10/2008 | Sufrin-Disler et al. |
| 2008/0268341 A1 | 10/2008 | Zhang |
| 2009/0018668 A1 | 1/2009 | Galbraith |
| 2009/0027006 A1 | 1/2009 | Vezzini et al. |
| 2009/0081488 A1 | 3/2009 | Sato et al. |
| 2009/0087700 A1 | 4/2009 | Carlisle et al. |
| 2009/0117429 A1 | 5/2009 | Zillmer et al. |

(56) References Cited

U.S. PATENT DOCUMENTS

| | | |
|---|---|---|
| 2009/0163394 A1 | 6/2009 | Muraishi et al. |
| 2009/0167242 A1 | 7/2009 | Naganuma et al. |
| 2009/0230921 A1 | 9/2009 | Hsu et al. |
| 2009/0233153 A1 | 9/2009 | Carlisle et al. |
| 2009/0239131 A1 | 9/2009 | Winter |
| 2009/0239132 A1 | 9/2009 | Johnson |
| 2009/0284229 A1 | 11/2009 | Friesen et al. |
| 2009/0286149 A1 | 11/2009 | Ci et al. |
| 2009/0305090 A1 | 12/2009 | Chuang |
| 2010/0003570 A1 | 1/2010 | Finsterwalder et al. |
| 2010/0055508 A1 | 3/2010 | Renn |
| 2010/0062303 A1 | 3/2010 | Bae et al. |
| 2010/0062313 A1 | 3/2010 | Browning et al. |
| 2010/0119895 A1 | 5/2010 | Friesen |
| 2010/0119956 A1 | 5/2010 | Tokuda et al. |
| 2010/0196768 A1 | 8/2010 | Roberts et al. |
| 2010/0261272 A1 | 10/2010 | Chalmers et al. |
| 2010/0266907 A1 | 10/2010 | Yazami |
| 2010/0285375 A1 | 11/2010 | Friesen et al. |
| 2010/0310905 A1 | 12/2010 | Oriet et al. |
| 2010/0310947 A1 | 12/2010 | Rich et al. |
| 2010/0316935 A1 | 12/2010 | Friesen et al. |
| 2011/0023428 A1 | 2/2011 | Ziebold et al. |
| 2011/0027648 A1 | 2/2011 | Rolison et al. |
| 2011/0039181 A1 | 2/2011 | Friesen et al. |
| 2011/0044528 A1 | 2/2011 | Tsuchiya et al. |
| 2011/0045325 A1 | 2/2011 | Anzai et al. |
| 2011/0059355 A1 | 3/2011 | Zhang et al. |
| 2011/0070481 A1 | 3/2011 | Liang et al. |
| 2011/0070506 A1 | 3/2011 | Friesen et al. |
| 2011/0086278 A1 | 4/2011 | Friesen et al. |
| 2011/0111314 A1 | 5/2011 | Cui et al. |
| 2011/0143219 A1 | 6/2011 | Weiss et al. |
| 2011/0189551 A1 | 8/2011 | Friesen et al. |
| 2011/0200893 A1 | 8/2011 | Friesen et al. |
| 2011/0236730 A1 | 9/2011 | Jones |
| 2011/0250512 A1 | 10/2011 | Friesen et al. |
| 2011/0281184 A1 | 11/2011 | Friesen et al. |
| 2011/0305959 A1 | 12/2011 | Friesen et al. |
| 2011/0316485 A1 | 12/2011 | Krishnan et al. |
| 2012/0009491 A1 | 1/2012 | Friesen et al. |
| 2012/0015264 A1 | 1/2012 | Friesen et al. |
| 2012/0021303 A1 | 1/2012 | Amendola et al. |
| 2012/0034536 A1 | 2/2012 | Isom et al. |
| 2012/0052404 A1 | 3/2012 | Friesen et al. |
| 2012/0068667 A1 | 3/2012 | Friesen et al. |
| 2012/0098499 A1 | 4/2012 | Friesen et al. |
| 2012/0139496 A1 | 6/2012 | Krishnan et al. |
| 2012/0187918 A1 | 7/2012 | Narayan et al. |
| 2012/0193224 A1 | 8/2012 | Suk |
| 2012/0193242 A1 | 8/2012 | Marchal |
| 2012/0202127 A1 | 8/2012 | Friesen et al. |
| 2012/0237838 A1 | 9/2012 | Uesaka |
| 2012/0295172 A1 | 11/2012 | Peled et al. |
| 2012/0321969 A1 | 12/2012 | Friesen et al. |
| 2012/0321970 A1 | 12/2012 | Friesen et al. |
| 2013/0022881 A1 | 1/2013 | Friesen et al. |
| 2013/0052013 A1 | 2/2013 | Eckart |
| 2013/0095393 A1 | 4/2013 | Friesen et al. |
| 2013/0106359 A1 | 5/2013 | Noda et al. |
| 2013/0115523 A1 | 5/2013 | Friesen et al. |
| 2013/0115525 A1 | 5/2013 | Friesen et al. |
| 2013/0115526 A1 | 5/2013 | Friesen et al. |
| 2013/0115531 A1 | 5/2013 | Amendola et al. |
| 2013/0115532 A1 | 5/2013 | Friesen et al. |
| 2013/0115533 A1 | 5/2013 | Friesen et al. |
| 2013/0149615 A1 | 6/2013 | Narayan et al. |
| 2013/0183591 A1 | 7/2013 | Dickson |
| 2013/0189592 A1 | 7/2013 | Roumi et al. |
| 2013/0285597 A1 | 10/2013 | Goldstein |
| 2013/0295471 A1 | 11/2013 | Visco et al. |
| 2014/0091631 A1 | 4/2014 | Naden et al. |
| 2014/0162096 A1 | 6/2014 | Lex et al. |
| 2014/0162129 A1 | 6/2014 | Kim et al. |
| 2014/0217985 A1 | 8/2014 | Gifford et al. |
| 2014/0220256 A1 | 8/2014 | Ogg |
| 2014/0220432 A1 | 8/2014 | Ogg et al. |
| 2014/0220434 A1 | 8/2014 | Ogg |
| 2014/0220435 A1 | 8/2014 | Ogg et al. |
| 2014/0220440 A1 | 8/2014 | Ogg |
| 2014/0220460 A1 | 8/2014 | Ogg et al. |
| 2014/0227615 A1 | 8/2014 | Friesen et al. |
| 2014/0234730 A1 | 8/2014 | Albertus et al. |
| 2014/0262760 A1 | 9/2014 | Hayes et al. |
| 2014/0272477 A1 | 9/2014 | West et al. |
| 2014/0342214 A1 | 11/2014 | Wegner et al. |
| 2015/0010833 A1 | 1/2015 | Amendola et al. |
| 2015/0086884 A1 | 3/2015 | Narayan et al. |
| 2015/0140455 A1 | 5/2015 | Imano |
| 2015/0372357 A1 | 12/2015 | Kruglak et al. |
| 2016/0020493 A1 | 1/2016 | Van Dijk et al. |
| 2016/0036094 A1 | 2/2016 | Ogg |
| 2016/0036095 A1 | 2/2016 | Ogg |
| 2016/0045841 A1 | 2/2016 | Kaplan et al. |
| 2016/0111730 A1 | 4/2016 | Kim et al. |
| 2016/0118636 A1 | 4/2016 | Jin et al. |
| 2016/0248136 A1 | 8/2016 | Bugga et al. |
| 2016/0293978 A1 | 10/2016 | Krishnan et al. |
| 2016/0308220 A1 | 10/2016 | Qi et al. |
| 2017/0141434 A1 | 5/2017 | Narayan et al. |
| 2017/0170451 A1 | 6/2017 | Englert |
| 2017/0173557 A1 | 6/2017 | Olson et al. |
| 2017/0207464 A1 | 7/2017 | Gyenge et al. |
| 2017/0271731 A1 | 9/2017 | Hayashi et al. |
| 2017/0352936 A1 | 12/2017 | Jin |
| 2018/0010228 A1 | 1/2018 | Ogg et al. |
| 2018/0048041 A1 | 2/2018 | Chen et al. |
| 2018/0123116 A1 | 5/2018 | Lee et al. |
| 2018/0145383 A1 | 5/2018 | Krishnan et al. |
| 2018/0219220 A1 | 8/2018 | Hayashi et al. |
| 2018/0241107 A1 | 8/2018 | Su et al. |
| 2018/0287237 A1 | 10/2018 | Manthiram et al. |
| 2018/0366799 A1 | 12/2018 | Amendola et al. |
| 2019/0051908 A1 | 2/2019 | Chen et al. |
| 2019/0074536 A1 | 3/2019 | Lee et al. |
| 2020/0006745 A1 | 1/2020 | Westwood et al. |
| 2020/0006796 A1 | 1/2020 | Su et al. |
| 2020/0006828 A1 | 1/2020 | Milshtein et al. |
| 2020/0006896 A1 | 1/2020 | Mahadik et al. |
| 2020/0036002 A1 | 1/2020 | Chakraborty et al. |
| 2020/0136153 A1 | 4/2020 | Jaramillo et al. |
| 2020/0266423 A1 | 8/2020 | Kitagawa et al. |
| 2020/0280064 A1 | 9/2020 | Takahashi et al. |
| 2020/0411879 A1 | 12/2020 | Hartman et al. |
| 2020/0411932 A1 | 12/2020 | Weber et al. |
| 2021/0013536 A1 | 1/2021 | Golden et al. |
| 2021/0028452 A1 | 1/2021 | Su et al. |
| 2021/0028457 A1 | 1/2021 | Newhouse et al. |

FOREIGN PATENT DOCUMENTS

| | | |
|---|---|---|
| CN | 1543685 A | 11/2004 |
| CN | 2888658 Y | 4/2007 |
| CN | 101142706 A | 3/2008 |
| CN | 102232004 A | 11/2011 |
| CN | 103003199 A | 3/2013 |
| CN | 103098299 A | 5/2013 |
| CN | 103400947 A | 11/2013 |
| CN | 103443982 A | 12/2013 |
| CN | 103515636 A | 1/2014 |
| CN | 104269570 A | 1/2015 |
| CN | 206340592 U | 7/2017 |
| CN | 109478653 A | 3/2019 |
| DE | 1266021 B | 4/1968 |
| EP | 0037634 A1 | 10/1981 |
| EP | 0058090 A1 | 8/1982 |
| EP | 0277937 A1 | 8/1988 |
| EP | 0677883 A1 | 10/1995 |
| EP | 0598144 B1 | 10/1996 |
| EP | 0637291 B1 | 10/1997 |
| EP | 0664932 B1 | 1/1998 |
| EP | 0832502 A1 | 4/1998 |
| EP | 0823135 B1 | 11/1998 |
| EP | 0895528 A1 | 2/1999 |

(56) References Cited

FOREIGN PATENT DOCUMENTS

| | | |
|---|---|---|
| EP | 0987349 A1 | 3/2000 |
| EP | 0835334 B1 | 9/2002 |
| EP | 1027747 B1 | 9/2002 |
| EP | 1413001 B1 | 4/2005 |
| EP | 1266413 B1 | 5/2005 |
| EP | 1723687 A1 | 11/2006 |
| EP | 1723687 B1 | 5/2010 |
| EP | 2274781 A1 | 1/2011 |
| EP | 1977475 B1 | 2/2012 |
| EP | 2486622 B1 | 7/2014 |
| EP | 2424016 B1 | 10/2014 |
| EP | 2823528 B1 | 3/2016 |
| EP | 2586092 B1 | 1/2017 |
| EP | 2619835 B1 | 6/2017 |
| EP | 2792004 B1 | 11/2017 |
| EP | 2721688 B1 | 2/2018 |
| EP | 2774205 B1 | 3/2018 |
| EP | 2954583 B1 | 4/2018 |
| EP | 2559097 B1 | 5/2018 |
| EP | 2596545 B1 | 6/2018 |
| EP | 2659536 B1 | 8/2018 |
| GB | 1238356 A | 7/1971 |
| GB | 1286173 A | 8/1972 |
| IN | 201917002254 A | 4/2019 |
| JP | S4827097 A | 4/1973 |
| JP | S4827097 B1 | 8/1973 |
| JP | S56500790 A | 6/1981 |
| JP | S56162870 A | 12/1981 |
| JP | S56162870 U | 12/1981 |
| JP | H01159973 A | 6/1989 |
| JP | H01163977 A | 6/1989 |
| JP | H0790662 A | 4/1995 |
| JP | H09501256 A | 2/1997 |
| JP | H10509554 A | 9/1998 |
| JP | 2000205200 A | 7/2000 |
| JP | 2002194411 A | 7/2002 |
| JP | 3387724 B2 | 3/2003 |
| JP | 2008251491 A | 10/2008 |
| JP | 2008277315 A | 11/2008 |
| JP | 2009529213 A | 8/2009 |
| JP | 2009543674 A | 12/2009 |
| JP | 2010140736 A | 6/2010 |
| JP | 2010192313 A | 9/2010 |
| JP | 2010262876 A | 11/2010 |
| JP | 2011003313 A | 1/2011 |
| JP | 2011173083 A | 9/2011 |
| JP | 2011228079 A | 11/2011 |
| JP | 2012518095 A | 8/2012 |
| JP | 2013503257 A | 1/2013 |
| JP | 2013505544 A | 2/2013 |
| JP | 2013507741 A | 3/2013 |
| JP | 2013134838 A | 7/2013 |
| JP | 2014127289 A | 7/2014 |
| JP | 2014150056 A | 8/2014 |
| JP | 2015076379 A | 4/2015 |
| JP | 2016091605 A | 5/2016 |
| JP | 5952540 B2 | 7/2016 |
| JP | 6032018 B2 | 11/2016 |
| JP | 2017076595 A | 4/2017 |
| JP | 2017139231 A | 8/2017 |
| JP | 6234917 B2 | 11/2017 |
| JP | 2017216126 A | 12/2017 |
| JP | 2018006057 A | 1/2018 |
| JP | 2018067399 A | 4/2018 |
| JP | 6352884 B2 | 7/2018 |
| JP | 6363244 B2 | 7/2018 |
| JP | 2018529207 A | 10/2018 |
| JP | 6682102 B2 | 4/2020 |
| KR | 20120122053 A | 11/2012 |
| KR | 20140068850 A | 6/2014 |
| KR | 20160115912 A | 10/2016 |
| KR | 20180063144 A | 6/2018 |
| KR | 20190066865 A | 6/2019 |
| WO | 8402429 A1 | 6/1984 |
| WO | 8905528 A1 | 6/1989 |
| WO | 9321664 A1 | 10/1993 |
| WO | 0201666 A2 | 1/2002 |
| WO | 2008058165 A2 | 5/2008 |
| WO | 2009087917 A1 | 7/2009 |
| WO | 2010065890 A1 | 6/2010 |
| WO | 2011035176 A1 | 3/2011 |
| WO | 2011044528 A1 | 4/2011 |
| WO | 2011103142 A1 | 8/2011 |
| WO | 2011163553 A1 | 12/2011 |
| WO | 2012012364 A1 | 1/2012 |
| WO | 2012012558 A2 | 1/2012 |
| WO | 2012156972 A1 | 11/2012 |
| WO | 2013005050 A1 | 1/2013 |
| WO | 2012174433 A3 | 3/2013 |
| WO | 2013053653 A2 | 4/2013 |
| WO | 2013090680 A2 | 6/2013 |
| WO | 2014124386 A1 | 8/2014 |
| WO | 2014142666 A1 | 9/2014 |
| WO | 2015042573 A1 | 3/2015 |
| WO | 2015119041 A1 | 8/2015 |
| WO | 2015145690 A1 | 10/2015 |
| WO | 2015150784 A1 | 10/2015 |
| WO | 2016088673 A1 | 6/2016 |
| WO | 2016138594 A1 | 9/2016 |
| WO | 2016197109 A1 | 12/2016 |
| WO | 2017006666 A1 | 1/2017 |
| WO | 2017045072 A1 | 3/2017 |
| WO | 2017049414 A1 | 3/2017 |
| WO | 2017075577 A1 | 5/2017 |
| WO | 2017117373 A1 | 7/2017 |
| WO | 2017223219 A1 | 12/2017 |
| WO | 2018009930 A2 | 1/2018 |
| WO | 2018018036 A1 | 1/2018 |
| WO | 2018052376 A1 | 3/2018 |
| WO | 2018187561 A1 | 10/2018 |
| WO | 2020006419 A1 | 1/2020 |
| WO | 2020006436 A1 | 1/2020 |
| WO | 2020006506 A2 | 1/2020 |
| WO | 2020023912 A1 | 1/2020 |
| WO | 2020264344 A1 | 12/2020 |
| WO | 2020264386 A1 | 12/2020 |
| WO | 2020264415 A1 | 12/2020 |
| WO | 2021021681 A1 | 2/2021 |
| WO | 2021021685 A1 | 2/2021 |

OTHER PUBLICATIONS

Office Action dated Jun. 17, 2021, issued in corresponding Brazilian Application No. BR112019000713-0 with informal translation (5 pgs ).

International Search Report and Written Opinion of the International Searching Authority dated Nov. 29, 2017 issued in International Application No. PCT/US2017/043489.

International Preliminary Report on Patentability dated Aug. 6, 2018 issued in International Application No. PCT/US2017/043489.

International Preliminary Report on Patentability for International Application No. PCT/US2016/023564, dated May 30, 2017, 16 Pages.

International Preliminary Report on Patentability for International Application No. PCT/US2016/036026 dated Oct. 13, 2017, 26 Pages.

International Preliminary Report on Patentability for International Application No. PCT/US2017/043500, dated Jul. 23, 2018, 18 Pages.

International Preliminary Report on Patentability for International Application No. PCT/US2019/039844, dated Jan. 7, 2021, 11 Pages.

International Preliminary Report on Patentability for International Application No. PCT/US2019/039973, dated Jan. 7, 2021, 20 Pages.

International Preliminary Report on Patentability for International Application No. PCT/US2020/031760, dated Nov. 25, 2021, 07 Pages.

International Preliminary Report on Patentability for International Application No. PCT/US2020/039889, dated Jan. 6, 2022, 8 Pages.

(56) References Cited

OTHER PUBLICATIONS

International Preliminary Report on Patentability for International Application No. PCT/US2020/061081, dated Jun. 2, 2022, 07 Pages.
International Search Report and Written Opinion for International Application No. PCT/US2011/049558 dated Nov. 16, 2011, 11 pages.
International Search Report and Written Opinion for International Application No. PCT/US2012/047395 dated Sep. 28, 2012, 10 pages.
International Search Report and Written Opinion for International Application No. PCT/US2012/062503, dated Jan. 24, 2013, 09 Pages.
International Search Report and Written Opinion for International Application No. PCT/US2014/015613, dated Jul. 11, 2014, 23 Pages.
International Search Report and Written Opinion for International Application No. PCT/US2016/023564, dated Jun. 16, 2016, 12 Pages.
International Search Report and Written Opinion for International Application No. PCT/US2017/043500, dated Nov. 29, 2017, 12 Pages.
International Search Report and Written Opinion for International Application No. PCT/US2020/061081, dated Apr. 19, 2021, 10 Pages.
International Search Report and Written Opinion for International Application No. PCT/US2021/031184, dated Aug. 27, 2021, 07 Pages.
International Search Report and Written Opinion of International Application No. POT/US2020/043630, dated Nov. 11, 2020, 9 Pages.
International Search Report and Written Opinion of the International Application No. PCT/US2020/043639, dated Nov. 13, 2020, 11 Pages.
International Search Report and Written Opinion of the International Searching Authority dated Aug. 25, 2020, issued in corresponding International Application No. PCT/US2020/031760, 13 Pages.
International Search Report and Written Opinion of the International Searching Authority for International Patent Application No. PCT/US2018/026243, dated Jul. 27, 2018, 12 Pages.
International Search Report and Written Opinion of the International Searching Authority for International Patent Application No. PCT/US2019/039844, dated Oct. 23, 2019, 15 Pages.
International Search Report and Written Opinion of the International Searching Authority for International Patent Application No. PCT/US2019/039867, dated Nov. 15, 2019, 19 Pages.
International Search Report and Written Opinion of the International Searching Authority for International Patent Application No. PCT/US2019/039973, dated Jan. 13, 2020, 26 Pages.
International Search Report and Written Opinion of the International Searching Authority for International Patent Application No. PCT/US2019/043745, dated Nov. 13, 2019, 17 Pages.
International Search Report for International Application No. PCT/US2009/039460, dated May 26, 2009, 3 pages.
International Search Report for International Application No. PCT/US2009/040658, dated Aug. 24, 2009, 3 pages.
International Search Report for International Application No. PCT/US2016/036026, dated Sep. 29, 2016, 05 Pages.
International Search Report for International Application No. PCT/US2019/031118 dated Aug. 29, 2019, 3 pages.
Japanese Office Action dated Feb. 9, 2016 for Application No. 2014-540009, 14 pages.
Japanese Office Action dated Jan. 10, 2017 for Application No. 2014-540009, 17 pages.
Jayashree, et al., "Air-Breathing Laminar Flow-Based Microfluidic Fuel Cell," Journal of American Chemical Society, 2005, vol. 127, pp. 16758-16759.
Ji X., et al., "Stabilizing Lithium-Sulphur Cathodes Using Polysulphide Reservoirs," Nature Communications, 2011, vol. 2, No. 325, 8 Pages, View Online, DOI: 10.1038/icomms1293.
Jin X., et al., "A High-Fidelity Multiphysics Model for the New Solid Oxide Iron-Air Redox Battery Part I: Bridging Mass Transport and Charge Transfer with Redox Cycle Kinetics," Journal of Power Sources, 2015, vol. 280, pp. 195-204.
Jorne J., et al., "Suppression of Dendrites and Roughness during Electrodeposition by Impinging Flow," Journal of the Electrochemical Society, Jun. 1987, vol. 134, No. 6, pp. 1399-1402.
Kadyk T., et al., "How to Enhance Gas Removal from Porous Electrodes?," Scientific Reports, 2016, vol. 6, No. 38780, pp. 1-14, View Online, DOI: 10.1038/SREP38780.
Klaus S., et al., "Effects of Fe Electrolyte Impurities on Ni(OH)2/NiOOH Structure and Oxygen Evolution Activity," View Online, Journal of Physical Chemistry C, 2015, vol. 119, No. 13, pp. 7243-7254, DOI:10.1021/acs.jpcc.5b00105.
Li Q., et al., "All Solid Lithium Polymer Batteries With a Novel Composite Polymer Electrolyte," Solid State Ionics, 2003, vol. 159, pp. 97-109.
Li Z., et al., "A High-Energy and Low-Cost Polysulfide/iodide Redox Flow Battery," Nano Energy, 2016, vol. 30, pp. 283-292.
Li Z., et al., "Air-Breathing Aqueous Sulfur Flow Battery for Ultralow-Cost Long-Duration Electrical Storage," Joule, Oct. 11, 2017, vol. 1, No. 2, pp. 306-327, XP055667017.
Li Z., et al., "Air-Breathing Aqueous Sulfur Flow Battery for Ultralow-Cost Long-Duration Electrical Storage," Joule 1, Cell Press, Oct. 11, 2017, vol. 1, No. 2, pp. 306-327, doi:10.1016/j.joule.2017.08.007, ISSN 2542-4351, XP055667017.
Licht S., "A Novel Aqueous Aluminum Permanganate Fuel Cell," Electrochemistry Communications, 1999, vol. 1, pp. 33-36.
"Low," Lexico.com, US Dictionary, Oxford University Press, Retrieved on Oct. 13, 2021, 5 Pages, Retrieved from URL: https://www.lexico.com/en/definition/low.
Mainar A.R., et al., "Alkaline Aqueous Electrolytes for Secondary Zinc-Air Batteries: An Overview," International Journal of Energy Research, 2016, vol. 40, pp. 1032-1049.
Malkhandi S., et al., "Organo-Sulfur Additives for Suppressing Hydrogen Evolution in Iron-air Battery," Abstract #688, 220th ECS Meeting, The Electrochemical Society, 2011, 1 page.
Matsuda A., et al., "Preparation of Hydroxide Ion Conductive KOH-ZrO2 Electrolyte for all-Solid State Iron/Air Secondary Battery," Solid State Ionics, 2014, vol. 262, pp. 188-191.
Maurya S., et al., "A Review on Recent Developments of Anion Exchange Membranes for Fuel Cells and Redox Flow Batteries," View online DOI: 10.1039/c5ra04741b, RSC Advances, 2015, vol. 5, pp. 37206-37230.
McKerracher R.D., et al., "A Review of the Iron-Air Secondary Battery for Energy Storage," View online DOI:10.1002/cplu.201402238, ChemPlusChem, 2015, vol. 80, pp. 323-335.
Merle G., et al., "Anion exchange membranes for alkaline fuel cells: A review," Journal of Membrane Science, 2011, vol. 377, 35 pages.
Mitra D., et al., "A Stable and Electrocatalytic Iron Electrode for Oxygen Evolution in Alkaline Water Electrolysis," published Online https://doi.org/10.1007/s11244-018-0971-9, Springer Science+Business Media, LLC, part of Springer Nature 2018, Apr. 23, 2018, 10 pages.
Mitra D., et al., "An Efficient and Robust Surface-Modified Iron Electrode for Oxygen Evolution in Alkaline Water Electrolysis," Journal of the Electrochemical Society, 2018, vol. 165, No. 5, pp. F392-F400.
Narayan S. R., et al., "Bi-Functional Oxygen Electrodes-Challenges and Prospects," The Electrochemical Society Interface, Summer 2015, pp. 65-69.
Neburchilov V., et al., "Metal-Air And Metal-Sulfur Batteries: Fundamentals and Applications," CRC Press Taylor & Francis Group, 6000 Broken Sound Parkway NW, Suite 300, Boca Raton, FL 33487-2742, Taylor 1 Francis Group, LLC, CRC Press is an imprint of Taylor & Francis Group, an Informa business, 2017, 210 Pages.
"Nickel," Efunda: The Ultimate Online Reference for Engineers, eFunda, Inc., Web, Sep. 5, 2014.

(56) References Cited

OTHER PUBLICATIONS

Non-Final Office Action dated Oct. 8, 2019 issued in corresponding Japanese Patent Application No. 2018-550404 with English translation, 4 pages.
Non-final Office Action U.S. Appl. No. 14/505,234 dated Aug. 25, 2017, 15 Pages.
Notice of Allowance for U.S. Appl. No. 14/505,234 dated Jun. 29, 2018, 10 Pages.
Notice of Allowance Japanese Patent Application No. 2015-557176 dated Mar. 13, 2018 with English translation, 5 pages.
Notification Concerning Transmittal of a Copy of International Preliminary Report on Patentability and Written Opinion of the International Search Authority for International Patent Application No. PCT/US2018/026243, dated Oct. 17, 2019 9 pages.
Notification of Transmittal of the International Search Report and Written Opinion of the International Search Authority or International Patent Application No. PCT/US2020/039889, dated Oct. 15, 2020, 11 pages.
Notification of Transmittal of the International Search Report and Written Opinion of the International Search Authority or International Patent Application No. PCT/US2020/039942, dated Oct. 22, 2020, 17 pages.
Notification of Transmittal of the International Search Report and Written Opinion of the International Search Authority or International Patent Application No. PCT/US2020/039976, dated Oct. 23, 2020, 11 pages.
Office Action dated Jan. 13, 2012 issued in corresponding Chinese Patent Application No. 201120307185.2 w/English translation, 9 Pages.
Office Action dated Mar. 28, 2017 in Chinese Application 201480017311.7, 21 pages.
Office Action dated May 7, 2021, issued in corresponding Chinese Patent Application No. 201780034966.9, with English translation, 18 pages.
Office Action for Australian Patent Application No. 2012332825 dated Nov. 25, 2015, 3 pages.
Office Action for Canadian Patent Application 2853245 dated Jun. 15, 2017, 3 pages.
Office Action for Canadian Patent Application 2853245 dated Sep. 23, 2016, 3 pages.
Office Action for Indian Patent Application No. 201817034674 dated May 27, 2020, 7 pages.
Office Action issued in corresponding Japanese Patent Application No. 2017-093977 dated May 8, 2018 with English translation, 4 pages.
Office Action issued in corresponding Mexico Application No. MX/a/2014/005136 dated Apr. 17, 2018.
Pan J., et al., "Constructing Ionic Highway in Alkaline Polymer Electrolytes," Energy and Environmental Science, 2014, vol. 7, pp. 354-360.
Park C.H., et al., "Electrochemical Stability and Conductivity Enhancement of Composite Polymer Electrolytes," Solid State Ionics, 2003, vol. 159, pp. 111-119.
Perkins N.R., et al., "Hydrogen Oxidation Electrodes and Electrochemical Cells Including the Same," U.S. Appl. No. 16/951,396, filed Nov. 18, 2020, 88 Pages.
"PTFE," Polymers: A Properties Database (Online), Taylor and Francis Group, LLC, Web, Sep. 5, 2014.
Rejection Decision, Japanese Patent Application No. 2015-557176 dated Oct. 17, 2017 with English translation, 12 pages.
Roe S., et al., "A High Energy Density Vanadium Redox Flow Battery with 3 M Vanadium Electrolyte," Journal of The Electrochemical Society, 2016, vol. 163, No. 1, pp. A5023-A5028.
Ross P.N., et al., "Feasibility Study of a New Zinc-Air Battery Concept Using Flowing Alkaline Electrolyte," Intersociety Energy Conversion Engineering Conference, Aug. 25, 1986, vol. 2, pp. 1066-1072.
Salloum et al., "Sequential Flow Membraneless Microfluidic Fuel Cell with Porous Electrodes," Journal of Power Sources, 2008, vol. 180, pp. 243-252.
Sandal H. et al., "Iron-Based Heterogeneous Catalysts for Oxygen Evolution Reaction, change in Perspective from Activity Promoter to Active Catalyst," Journal of Power Sources, 2018, vol. 395, 22 pages.
Sayilgan E., et al., "A Review of Technologies for the Recovery of Metals from Spent Alkaline and Zinc-Carbon Batteries," Hydrometallurgy, 2009, vol. 97, No. 3-4, pp. 158-166, XP026116549.
Second Office Action Chinese Patent Application No. 201480017311.7 dated Feb. 2, 2018 with English translation.
Sen R.K., et al., "Metal-Air Battery Assessment," Prepared for Office of Energy Storage and Distribution Conservation and Renewable Energy, The U.S. Department of Energy under Contract DE-AC06-76RLO 1830, Pacific Northwest Laboratory, Operated for the U.S. Department of Energy, 1988, 96 Pages.
Sevinc S., et al., "In-Situ Tracking of NaFePO4 Formation In Aqueous Electrolytes and its Electrochemical Performances In Na-Ion/Polysulfide Batteries," Journal of Power Sources, 2019, vol. 412, pp. 55-62.
Smedley, et al., "A Regenerative Zinc-air Fuel Cell," Journal of Power Sources, 2007, vol. 165, pp. 897-904.
Smith R.D.L., et al., "Water Oxidation Catalysis: Electrocatalytic Response to Metal Stoichiometry in Amorphous Metal Oxide Films Containing Iron, Cobalt, and Nickel," Journal of the American Chemical Society, 2013, vol. 135, No. 31, pp. 11580-11586.
Tekin B., et al., "A New Sodium-Based Aqueous Rechargeable Battery System: The Special Case of Na0.44MnO2/Dissolved Sodium Polysulfide," Energy Technology, 2017, vol. 5, pp. 2182-2188, DOI: 10.1002/ente.201700245.
Thirsk H.R., "Electrochemistry," Thirsk, Ed., The Chemical Society Great Britain Oxford Alden Press, 1974, vol. 4, pp. 16.
Tian B., et al., "The Effect of Na2S Additive in Alkaline Electrolyte on Improved Performances of Fe-Based Air Batteries," Electrochimica Acta, 2018, vol. 259, pp. 196-203.
Timofeeva E.V., "Rechargeable Nanofluid Electrodes for High Energy Density Flow Battery," NSTI-Nanotech, Jan. 1, 2013, vol. 2, pp. 679-682, XP055863711.
Trocino S., et al., "High Performance Solid-State Iron-Air Rechargeable Ceramic Battery Operating at Intermediate Temperatures (500-650 C)," Applied Energy, 2019, 9 Pages.
Wei X., et al., "An Aqueous Redox Flow Battery Based on Neutral Alkali Metal Ferri/Ferrocyanide and Polysulfide Electrolytes," Journal of The Electrochemical Society, Nov. 13, 2015, vol. 163, No. 1, pp. A5150-A5153, XP055667015.
Weinrich H., et al., "Understanding the Nanoscale Redox-Behavior of Iron-Anodes for Rechargeable Iron-Air Batteries," Nano Energy, Institute of Energy and Climate Research-Fundamental Electrochemistry (IEK-9) Center for Nanophase Materials Sciences, Oak Ridge National Laboratory. Oak Ridge, Tennessee 378, US, 2017, 46 pages, View Online https://doi.Org/10.1016/j.nanoen.2017.10.023.
Wijayamohanan K., et al., "Rechargeable Alkaline Iron Electrodes," Journal of Power Sources, 1991, vol. 34, pp. 269-285.
Wilke S.K., et al., "Structural Evolution of Directionally Freeze-Cast Iron Foams During Oxidation/Reduction Cycles," Acta Materialia, 2019, vol. 162, pp. 90-102.
Written Opinion for International Application No. PCT/US2016/036026, dated Sep. 29, 2016, 14 Pages.
Written Opinion of the International Preliminary Examining Authority dated Feb. 24, 2017 for Application. No. PCT/US2016/023564.
Written Opinion of the International Preliminary Examining Authority PCT/US2016/036026 dated May 9, 2017, 13 Pages.
Written Opinion of the International Searching Authority PCT/US2019/031118 dated Aug. 29, 2019, 13 Pages.
Yang B., et al., "Organo-Sulfur Molecules Enable Iron-Based Battery Electrodes to Meet the Challenges of Large-Scale Electrical Energy Storage," Energy Environment Science, 2014, vol. 7, pp. 2753-2763.
Yang C., et al., "Unique Aqueous Li-ion/sulfur Chemistry With High Energy Density and Reversibility," Proceedings of the National Academy of Sciences of the United States of America, Jun. 13, 2017, vol. 114, No. 24, pp. 6197-6202, Retrieved from URL:www.pnas.org/cgi/doi/10.1073/pnas.1703937114.

(56) References Cited

OTHER PUBLICATIONS

Agarwal R.C., et al., "Study of Electrical and Electrochemical Behaviour on Hot-press Synthesized Nano-Composite Polymer Electrolyte (NCPE) Membranes: [(70PEO: 30 KNO3) + x SiO2]," International Journal of Electrochemical Science, 2011, vol. 6, pp. 867-881.

Ai W., et al., "A Novel Graphene-Polysulfide Anode Material for High-Performance Lithium-Ion Batteries," Scientific Reports, 2013, vol. 3, No. 2341, 5 pages, DOI: 10.1038/srep0234.

Al-Hoshan M.S., et al., "Synthesis, Physicochemical and Electrochemical Properties of Nickel Ferrite Spinels Obtained by Hydrothermal Method for the Oxygen Evolution Reaction (OER)," International Journal of Electrochemical Science, 2012, vol. 7, pp. 4959-4973.

Arunchander A., et al., "Synthesis of Flower-Like Molybdenum Sulfide/Graphene Hybrid as an Efficient Oxygen Reduction Electrocatalyst for Anion Exchange Membrane Fuel Cells," Journal of Power Sources, 2017, vol. 353, pp. 104-114.

Bisoi S., et al., "Gas Separation Properties of Troeger's Base-Bridged Polyamides," e-Polymers, 2017, vol. 17, No. 4, pp. 283-293, DOI: https://doi.org/10.1515/epoly-2016-0291.

Blurton K.F., et al., "Metal/Air Batteries: Their Status and Potential—A Review," Journal of Power Sources, 1979, vol. 4, pp. 263-279.

Burke M.S., et al., "Cobalt-Iron (Oxy)Hydroxide Oxygen Evolution Electrocatalysts: The Role of Structure and Composition on Activity, Stability, and Mechanism," J. Am. Chem. Soc., vol. 137, pp. 3638-3648, DOI: 10.1021/acs.5b00281, (2015).

Burke M.S., et al., "Oxygen Evolution Reaction Electrocatalysis on Transition Metal Oxides and (Oxy)hydroxides Activity Trends and Design Principles," Department of Chemistry and Biochemistry, University of Oregon, Eugene, Oregon 97403, United States, Chemistry of Materials, 2015, 10 pages.

"Busbar," Lexico.com, US Dictionary, Oxford University Press, Retrieved on Oct. 13, 2021, 1 page, Retrieved from URL: https://www.lexico.com/en/definition/busbar.

Cakan R.D., et al., "An Aqueous Electrolyte Rechargeable Li-ion/Polysulfide Battery," Journal of Materials Chemistry X, GB, 2014, vol. 2, No. 24, 5 Pages, DOI:10.1039/C4TA01308E, ISSN 2050-7488, XP055886889, Retrieve from URL: https://pubs.rsc.org/en/content/articlepdf/2014/ta/c4ta01308e.

Carta M., et al., "The Synthesis of Microporous Polymers Using Tröger's Base Formation," Polymer Chemistry, 2014 Vol. 5, No. 18, pp. 5267-5272, DOI:10.1039/C4PY00609G, ISSN 1759-9954, XP055770813.

Chakraborty R., et al., "Negative Electrodes For Electrochemical Cells," U.S. Appl. No. 16/523,722, filed Jul. 26, 2019, 157 Pages.

Chen Y., et al., "Harvesting Polysulfides by Sealing the Sulfur Electrode in a Composite Ion-Selective Net," Journal of Power Sources, 2017, vol. 368, pp. 38-45.

Cherepy N.J., et al., "A Zinc/Air Fuel Cell for Electric Vehicles," IEEE publication, 1999, pp. 11-14.

Chiang Y.M., et al., "High Capacity, Temperature-Stable Lithium Aluminum Manganese Oxide Cathodes for Rechargeable Batteries," Electrochemical and Solid-State Letters, 1999, vol. 2, No. 3, pp. 107-110.

Chinese Office Action dated Dec. 28, 2015 for Appln. No. 2015122301567800.

Chinese Office Action dated Feb. 19, 2013 (with partial English Language translation) of Chinese Patent Appln. No. 201220585211.2 filed Nov 16, 2012, 4 Pages.

Chinese Office Action dated Feb. 3, 2017 for Application No. 2012800344431, 7 pages.

Chinese Office Action dated Jul. 18, 2016 for Appln. No. 2012102393449.

Chinese Office Action dated May 4, 2016 for Application No. 2012800344431, 17 pages.

Chinese Search Report dated Dec. 6, 2012 of Chinese Appl No. 201220336003.9 filed Jul. 10, 2012 (1 page Chinese Actionwith 3-page Engl. translation).

Cohen J.L., et al., "Fabrication and Preliminary Testing of a Planar Membraneless Microchannel Fuel Cell," Journal of Power Sources, 2005, vol. 139, pp. 96-105.

Colli A.N., et al., "High Energy Density MnO4-/MnO42- Redox Couple for Alkaline Redox Flow Batteries," Chemical Communications, 2016, vol. 52, pp. 14039-14042.

Communication under Rule 71(3) EPC, EP Application No. 14749407.4, dated Sep. 29, 2017, 6 Pages.

Cui B., et al., "Improved Cycle Iron Molten Air Battery Performance Using a Robust Fin Air Electrode," Journal of The Electrochemical Society, 2017, vol. 164, No. 2, pp. A88-A92.

Decision to Grant EP Application No. 14749407.4 dated Mar. 8, 2018, 2 Pages.

Demir-Cakan R., et al., "Use of Ion-selective Polymer Membranes for an Aqueous Electrolyte Rechargeable Li-ion-Polysulphide Battery," Journal of Materials Chemistry A, 2015, vol. 3, pp. 2869-2875, DOI: 10.1039/c4ta05756b.

Dias F.B., et al., "Trends in Polymer Electrolytes for Secondary Lithium Batteries", Journal of Power Sources, 2000, vol. 88, pp. 169-191.

Djefors L., et al., "An-Iron-Air Vehicle Battery," Journal of Power Sources, 1977, vol. 2, pp. 287-296.

Egashira M., et al., "Iron-Air (Secondary and Primary)," Yamaguchi University, Yamaguchi, Japan & 2009 Elsevier B.V. All rights reserved, 2009, pp. 372-375.

Examination Report for Australian Patent Application No. 2014214641 dated Jun. 26, 2017, 6 pages.

Extended European Search Report for European Application No. 12845720.7, dated Jul. 16, 2015, 7 Pages.

Extended European Search Report for European Application No. 14749407.4, dated Aug. 31, 2016, 6 Pages.

Extended European Search Report for European Application No. 19826880.7, dated Feb. 4, 2022, 8 Pages.

Extended European Search Report for European Application No. 19827057.1, dated Feb. 11, 2022, 8 Pages.

Extended European Search Report of EP Application No. 09751078.8, dated Jul. 27, 2012, 6 Pages.

Ferrigno R., et al., "Membraneless Vanadium Redox Fuel Cell Using Laminar Flow," Journal of American Chemical Society, 2002, vol. 124, pp. 12930-12931.

Figueredo-Rodriguez H.A., et al., "A Rechargeable, Aqueous Iron Air Battery with Nanostructured Electrodes Capable of High Energy Density Operation," Journal of The Electrochemical Society, 2017, vol. 164, No. 6, pp. A1148-1157.

Gross M.M., et al., "Aqueous Polysulfide-Air Battery with a Mediator-Ion Solid Electrolyte and a Copper Sulfide Catalyst for Polysulfide Redox," ACS Applied Energy Materials, 2018, vol. 1, No. 12, 7 Pages, DOI: 10.1021/acsaem.8b01679.

Hall D.E., "Porous Nickel-Coated Steel Anodes for Alkaline Water Electrolysis: Corrosion Resistance," Journal of the Electrochemical Society, Feb. 1982, vol. 129, No. 2, pp. 310-315.

Hall D.E., "Ni(OH)2-Impregnated Anodes for Alkaline Water Electrolysis," Journal of Electrochemical Society, 1983, vol. 130, No. 2, pp. 517-521.

Hang B.T., et al., "Effect of Additives on the Electrochemical Properties of Fe2O3/C Nanocomposite for Fe/air Battery Anode," Journal of Electroanalytical Chemistry, 2016, vol. 762, pp. 59-65.

Hang B.T., et al., "Effect of Metal-sulfide Additives on Electrochemical Properties of Nano-sized Fe2O3-Loaded carbon or Fe/air Battery Anodes," Journal of Power Sources, 2007, vol. 168, pp. 522-532.

"High," Lexico.com, US Dictionary, Oxford University Press, Retrieved on Oct. 13, 2021, 7 pages, Retrieved from URL: https://www.lexico.com/en/definition/high.

International Preliminary Report on Patentability (Chapter 1 of the Patent Cooperation Treaty) for International Application No. PCT/US2009/040658 dated Dec. 2, 2010, 5 Pages.

International Preliminary Report on Patentability for International Application No. PCT/US12/47395 dated Sep. 19, 2014, 27 pages.

International Preliminary Report on Patentability for International Application No. PCT/US12/62503 dated Nov. 27, 2013, 25 pages.

(56) References Cited

OTHER PUBLICATIONS

International Preliminary Report on Patentability for International Application No. PCT/US2011/049558 dated Jan. 11, 2013, 15 pages.

International Preliminary Report on Patentability for International Application No. PCT/US2012/062503, dated Oct. 19, 2013, 25 Pages.

International Preliminary Report on Patentability for International Application No. PCT/US2014/015613, dated Aug. 20, 2015, 19 Pages.

You S., et al., "A Microbial Fuel Cell Using Permanganate as the Cathodic Electron Acceptor," Journal of Power Sources, 2006, vol. 162, pp. 1409-1415.

Yu W., et al., "Toward a New Generation of Low Cost, Efficient, and Durable Metal-Air Flow Batteries," Journal of Materials Chemistry A, Royal Society of Chemistry, GB, Dec. 3, 2019, vol. 7, No. 47, pp. 26744-26768, DOI: 10.1039/C9TA10658H, ISSN 2050-7488, XP055863708.

Yu X., et al., "A Voltage-Enhanced, Low-Cost Aqueous Iron-Air Battery Enabled with a Mediator-Ion Solid Electrolyte," ACS Energy Letters, 2017, vol. 2, pp. 1050-1055, DOI: 10.1021/acsenergylett.7b00168.

Yun S., et al., "Materials and Device Constructions for Aqueous Lithium-Sulfur Batteries," Advanced Functional Materials, 2018, vol. 28, pp. 1-17, (1707593), DOI: 10.1002/adfm.201707593.

Zheng J., et al., "Rotating Ring-Disk Electrode Method," Rotating Electrode Methods and Oxygen Reduction Electrocatalysts, NL, Elsevier, Apr. 25, 2014, pp. 199-229, DOI: 10.1016/B978-0-444-63278-4.00006-9, ISBN 9780444632784, XP009522170.

International Preliminary Report on Patentability for International Application No. PCT/US2021/031184, dated Nov. 17, 2022, 6 Pages.

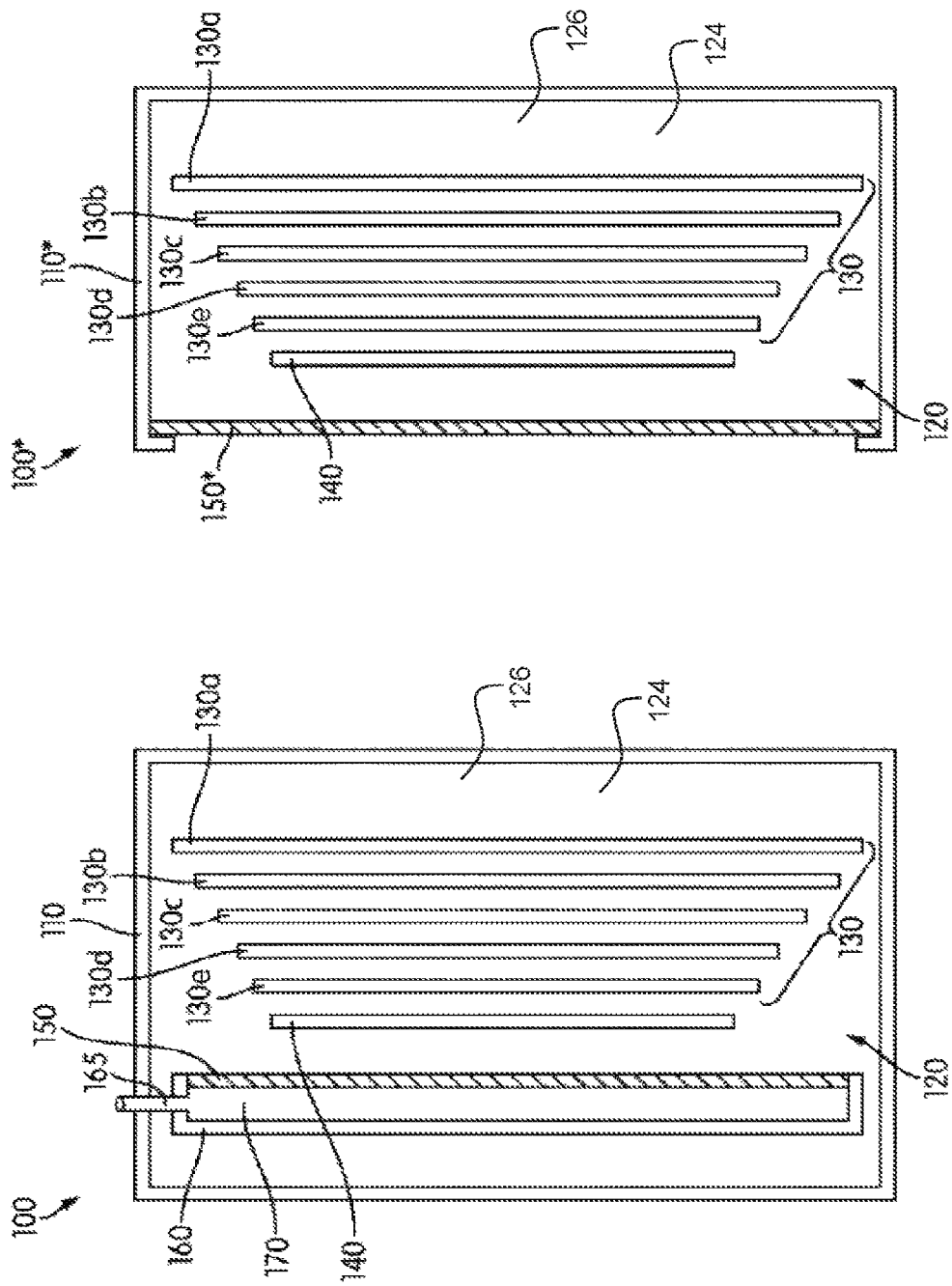

MOISTURE AND CARBON DIOXIDE MANAGEMENT SYSTEM IN ELECTROCHEMICAL CELLS

CROSS REFERENCE TO RELATED APPLICATIONS

This application is a Continuation of U.S. Ser. No. 16/318,513, filed Jan. 17, 2019, which is the U.S. National Phase of PCT/US2017/043489, filed Jul. 24, 2017, which claims priority to Provisional Patent Application Ser. No. 62/365,866, filed Jul. 22, 2016, the subject matter of each of which is incorporated by reference herein in its entirety.

BACKGROUND

Field

The present disclosure is directed to moisture and carbon dioxide management systems for electrochemical cells, and more in particular, to electrochemical cells comprising air breathing cathodes and utilizing a liquid ionically conductive medium.

Background

Many types of electrochemical cells utilize a liquid ionically conductive medium to support electrochemical reactions within the cell. Electrochemical cells may utilize an air breathing electrode coupled to a fuel electrode, comprising any suitable fuel. For example, a metal-air electrochemical cell system may comprise a plurality of cells, each having a fuel electrode serving as an anode at which metal fuel is oxidized, and an air breathing oxidant reduction electrode at which oxygen from ambient air is reduced. The liquid ionically conductive medium in such cells may communicate the oxidized/reduced ions between the electrodes.

In various ionically conductive mediums, evaporation, electrolysis (e.g. water splitting on recharge or during self-discharge) or other loss of moisture from the ionically conductive medium, may be detrimental to the electrochemical cell, particularly for cells requiring water to operate. For example, salting of the ionically conductive medium due to water loss, may clog an oxidant electrode of the electrochemical cell, reducing its performance or, in extreme cases, resulting in complete cell failure. Such salting or other failures may occur, for example, where an air-side of the oxidant electrode, or a portion thereof, is excessively dry. Additionally, a decrease in water content in the ionically conductive medium may decrease the medium's solvating capacity, i.e., its ability to dissolve solutes, or increase the percentage concentration of solutes in the medium, affecting the functionality of the ironically conductive medium.

Metal-air electrochemical cells are utilized in a wide variety of environmental conditions, including very hot and dry environments. These cells may have limited effectiveness and/or life as a result of the loss of moisture from the liquid ionically conductive medium.

Electrochemical cell water conservation and management systems have been developed such as U.S. patent application Ser. No. 14/176,888, filed Feb. 10, 2014, Fluidic Inc., which provides an example of a battery water management system; the entirety of which is hereby incorporated by reference in its entirety.

SUMMARY

The disclosure is directed to an electrochemical cell, such as a metal-air electrochemical cell that can effectively operate in a wide range of environmental conditions, including very arid environments. Many electrochemical reactions benefit from an oxygen rich air supply or an airflow with reduced carbon dioxide. In addition, in alkaline fuel cells or rechargeable battery systems comprising an alkaline electrolyte, carbon dioxide can react with the electrolyte to form potassium carbonate, which lowers the conductivity of the electrolyte by decreasing the hydroxide concentration and decreasing the solubility of a metal species, such as zinc. In addition, precipitation of carbonate within the pores of the air electrode can damage the electrode, expand the pore structure and lead to leakage. It is to be understood that some embodiments of the moisture, i.e. water, and carbon dioxide management system described herein, may be utilized in various electrochemical cells, including fuel cells and in particular, alkaline fuel cells and polymer electrolyte membrane (PEM) fuel cells. In alkaline electrochemical cells, such as metal-air batteries, that use air breathing electrodes which have open communication to air at ambient conditions, carbon dioxide is absorbed from the air into the electrolyte through the air breathing electrode, and moisture (water) is lost from the electrolyte to the air (ambient) through evaporation through the air breathing electrode. This disclosure utilizes multiple mechanisms and/or methods, e.g., four, to decrease the amount of carbon dioxide absorbed from the air and moisture lost to the air, e.g., in accordance with one embodiment: a carbon dioxide scrubber to remove carbon dioxide from the air prior to it entering the air breathing electrode chamber; a humidity exchange membrane (HEM) which transfers moisture lost through evaporation into the air stream leaving the air breathing electrode chamber back into the air stream entering the air breathing electrode chamber; an air recirculation mechanism that directs a portion of carbon dioxide depleted, humidity laden air leaving the air breathing electrode chamber back into the air stream entering the air breathing electrode chamber; and a vent filter that catches and returns electrolyte liquid droplets leaving the cell as a mist due to gas generated during normal cell electrochemical reactions and returning that liquid back to the cell. These mechanisms may operate independently or dependently to reduce the amount of carbon dioxide absorbed into the electrolyte and to reduce the amount of moisture lost from the cell.

The summary of the disclosure is provided as a general introduction to some of the embodiments of the disclosure, and is not intended to be limiting. Additional example embodiments including variations and alternative configurations of the disclosure are provided herein.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure.

FIG. 1 depicts a schematic view of an electrochemical cell having an immersed oxidant reduction electrode.

FIG. 2 depicts a schematic view of an electrochemical cell having an oxidant reduction electrode which defines a boundary wall for the electrochemical cell.

DETAILED DESCRIPTION OF THE ILLUSTRATED EMBODIMENTS

Figure 3:
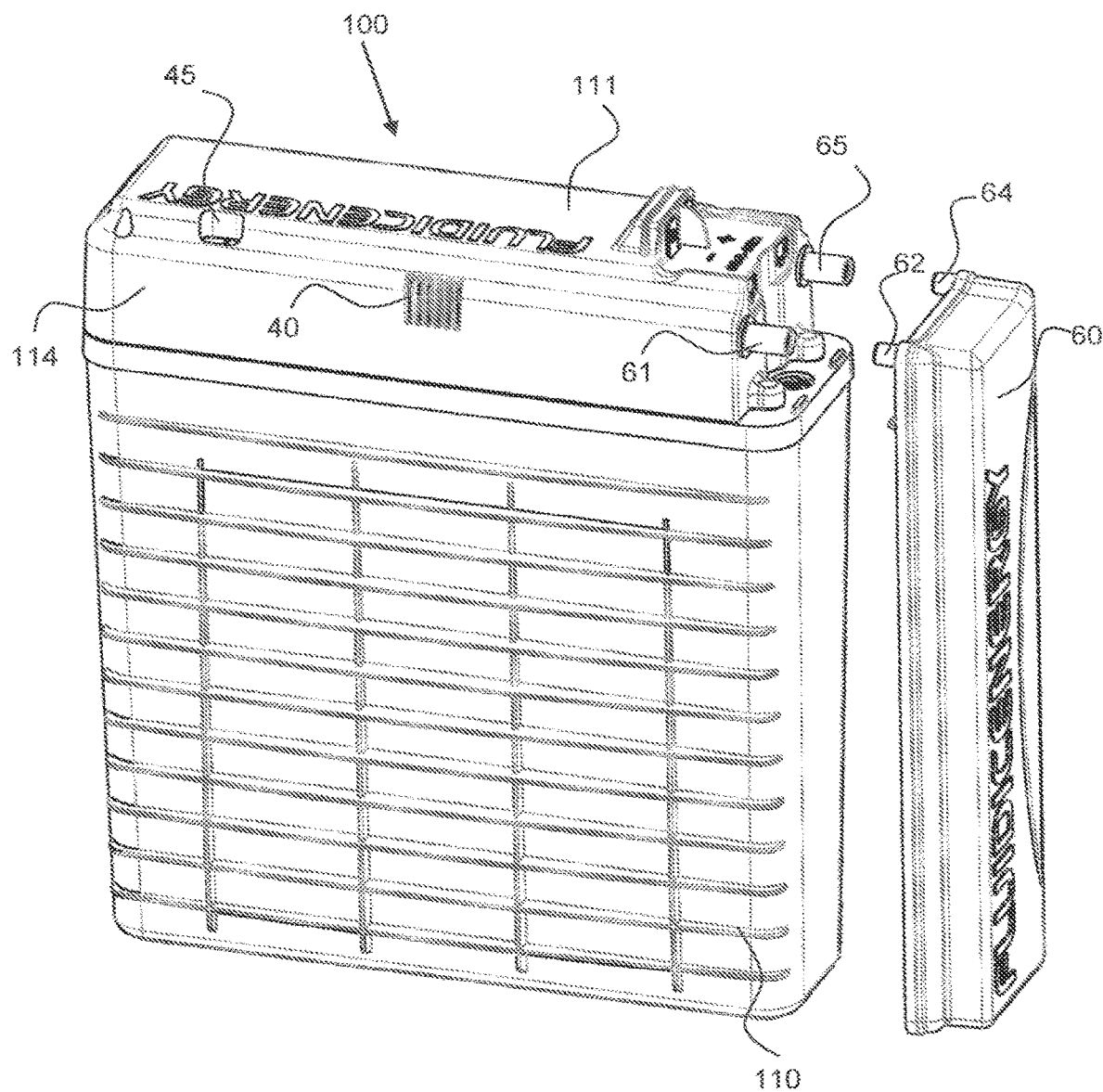
FIG. 3 shows a side perspective view of an exemplary electrochemical cell having a scrubber module that is detached from the cell housing.

Corresponding reference characters indicate corresponding parts throughout the several views of the figures. The figures represent an illustration of some of the embodiments of the present disclosure and are not to be construed as limiting the scope of the disclosure in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the disclosure. This description should be read to include one or at least one and the singular also includes the plural unless it is obvious that it is meant otherwise.

Certain exemplary embodiments of the present disclosure are described herein and are illustrated in the accompanying figures. The embodiments described are only for purposes of illustrating the present disclosure and should not be interpreted as limiting the scope of the disclosure. Other embodiments of the disclosure, and certain modifications, combinations and improvements of the described embodiments, will occur to those skilled in the art and all such alternate embodiments, combinations, modifications, improvements are within the scope of the present disclosure.

An exemplary moisture and carbon dioxide system in accordance with embodiments of this disclosure may comprise a recirculation mechanism wherein at least a portion of the air exiting the electrochemical cell is recirculated back into the air inflow to the cell. Many electrochemical cells produce heat and an exhaust flow that is high in humidity and therefore conserving this moisture through recirculation can effectively conserve the moisture in the system.

An exemplary moisture and carbon dioxide management system in accordance with embodiments of this disclosure comprises a humidity exchange membrane (HEM), for transfer of moisture from the outflow of air from a chamber containing the air breathing electrode of the electrochemical cell to the air inflow of said chamber. The HEM comprises a moisture exchange material, such as a membrane comprising an ionomer, such as perfluorosulfonic acid polymer, for example. A HEM separates air inflow to the cell from air exiting the electrochemical cell, such as from the oxidant reduction electrode air chamber, whereby moisture from the air exiting the cell is transferred through the humidity exchange membrane to the air inflow due to a relative humidity (RH) difference across the membrane (air outflow at high RH, air inflow at low RH). The air exiting the oxidant reduction electrode air chamber, or air chamber outflow, is warm and humid and therefore can carry a relatively high amount of moisture which enables the HEM to work effectively. This exiting air picks up moisture from the liquid ionically conductive medium as it flows through the cell and is heated due to the increased heat from the chemical reactions. The air chamber outflow may be hotter and contain a relatively high moisture content. For example, the air chamber outflow may be 10° C., 20° C., 30° C., or 40° C. hotter than the air inflow. The electrochemical reactions within the cell heat the air chamber and also humidify the air chamber air. For example, the air chamber outflow may have a relative humidity of more than about 70%, more than about 80%, more than about 90%, more than about 95%, and substantially fully saturated, depending on the flow rates, size of the system and environmental conditions. As an example, air inflow may be very dry, at only 20% relative humidity at 30° C. and may pass by a HEM module having air chamber outflow on the opposing side of the HEM at 90% relative humidity at 50° C., to increase the air inflow humidity to about 70% before entering the cell. A HEM may be configured in a module comprising multiple layers, folds, pleats or corrugations of the HEM to increase the amount of surface area that the air stream must flow over, thereby increase the amount of moisture transferred. In accordance with an embodiment, a marketed or manufactured HEM or HEM module may be used. An exemplary HEM or HEM module is available from DPoint Technologies, Vancouver, BC, Canada, for example, and may be used in the disclosed system. However, this example is not intended to be limiting.

An exemplary moisture and carbon dioxide management system in accordance with embodiments of this disclosure comprises a recirculation feature, such as a valve or other mechanism, that may be configured to reintroduce some of the air chamber outflow directly back into the air inflow, thereby increasing the moisture level of the air inflow. When an electrochemical cell is located in a very arid environment, recirculation of the outflow air into the air inflow can effectively conserve moisture in the system. A recirculation feature may be configured upstream, prior to the inflow air reaching the HEM, or downstream of the HEM. In one embodiment, it may be preferred to locate a recirculation feature upstream of the HEM, whereby the outflow air flows past the HEM, thereby maintaining the HEM in a warm moist state, prior to recirculation. As described herein, in some embodiments, a HEM may work more effectively when maintained in a warm and moist condition. A recirculation feature may be a valve that is operated by a control system or may be a baffle that is automatically controlled by pressure. A control system may monitor the moisture level within and external to the system, such as relative humidity, RH, of the air inflow, the air outflow, the ambient RH, the liquid electrolyte level and the like to determine when and how much recirculation to include into the air inflow. The air exiting the oxidant reduction electrode air chamber, or air chamber outflow, is warm and humid and a portion or amount thereof may be recirculated into the air inflow. In one embodiment, a valve is opened and closed to control when the air chamber outflow is recirculated and what portion or amount is recirculated. For example, in very arid environments, a high proportion of the air chamber outflow may be recirculated, such as about 40% or more, about 50% or more, about 70% or more, about 90% or more, or all of the air chamber outflow or any portion between and including the percentages provided. The remaining air chamber outflow may be passed through the air flow device and out of the cell.

For example, in one embodiment, an exemplary electrochemical cell may utilize a recirculation feature that provides about 50% of the inflow to the cell from air outflow from the cell. The ambient air, or inlet air may comprise about 400 ppm carbon dioxide, 50% RH, and 21.2% oxygen. The air outflow from the cell may have a reduced carbon dioxide concentration, such as about 0%, due to the scrubber and/or reaction within the cell, 100% RH, and a reduced oxygen concentration of about 12%. When the ambient air and air outflow from the cell are mixed through the recirculation feature the inlet airflow to the cell will have a 200 ppm carbon dioxide concentration, about 75% RH, and 18% oxygen. The electrochemical cell may be configured to run at a three or four stoichiometry for oxygen and therefore a slightly reduced oxygen concentration will not create a loss of power generation potential. In addition, there will be a large benefit from the increase humidity level and reduced carbon dioxide level which will result in extending the life of the electrochemical cell.

An exemplary moisture and carbon dioxide management system in accordance with embodiments of this disclosure comprises a mist elimination system that may be incorporated to control the loss of liquid ionically conductive medium, such as an electrolyte. A mist elimination system may comprise a baffle or valve, a filter, a hydrogen recombination catalyst, a neutralizer and a hydrophobic filter. An exemplary mist elimination system reacts hydrogen to form water that may be drained back into the electrochemical cell. Gasses produced during normal cell operation, such as for a metal-air cell during self-discharge or cell charge, rise to the surface of the electrolyte as bubbles which burst at the electrolyte surface. The action of the bursting bubble generates a fine mist of electrolyte which will leave the cell with the effluent gas stream. An exemplary mist elimination filter is placed in this gas stream to recapture this electrolyte mist and return it to the liquid electrolyte.

The operational relative humidity ranges, or humidity ranges within the air chamber, may depend on the particular ionically conductive medium, in addition to the temperature of ambient air and the cell, for example. It may be appreciated that aqueous salt electrolytes, e.g., potassium hydroxide, may be characterized as hygroscopic. For example, for a cell comprising an aqueous KOH electrolyte, a relative humidity less than ca. 50% may result in water loss through the oxidant reduction electrode, or air electrode. An ambient relative humidity greater than 80% (or greater than ca. 80%) may result in water uptake into the cell through the oxidant reduction electrode, or air electrode. Water release through the air electrode may occur at greater relative humidity than ca. 50% in an air temperature range of 50 degrees Celsius to 80 degrees Celsius. A relative humidity from 50% (inclusive) to 80% (inclusive), or in a mid-range, may be characterized as neutral. For example, at 70% relatively humidity into the cell, 250 ml of water may be lost at 50 degrees C., and only 15 ml (which is considered negligible in a cell having 8 liters total volume) is lost at 25 degrees C. It should be appreciated that the ranges may also and/or alternatively change depending on the ionically conductive medium and its hygroscopic/hygrophobic characteristics.

A variety of water management techniques are described herein and may be used with the disclosed system. U.S. patent application Ser. No. 15/077,341, to Fluidic Inc., filed on Mar. 22, 2016, entitled Water Management System In Electrochemical Cells with Vapor Return Comprising Air Electrodes describes some other water management systems and techniques and is incorporated, in its entirety, by reference herein.

An exemplary moisture and carbon dioxide management system in accordance with embodiments of this disclosure comprises a scrubber module for removing carbon dioxide, $CO_2$, from the air inflow to the cell. Some exemplary scrubber media, such as soda-lime, requires some moisture to react with the carbon dioxide. The scrubber media may absorb some moisture from the air inflow. This absorbed moisture may be reintroduced to the cell by heating of the scrubber. Heating may be passive heating, wherein heat generated from the cell is used to heat the scrubber, or a dedicated resistive heater element may be used to heat the scrubber.

An exemplary scrubber system operates more effectively when the incoming air to the scrubber is humidified and therefore receiving inflow air to the scrubber after passing through the HEM may improve overall system effectiveness. The scrubber may absorb some of the moisture from the airflow therethrough, and this absorbed moisture may be reintroduced to the cell by heating the scrubber. Heating may be passive heating, wherein heat generated from the cell is used to heat the scrubber, or a dedicated resistive heater element, controlled by the controller, may be used to heat the scrubber. In the case of passive heating, heat from the electrochemical cell may be conducted to the scrubber module and specifically to the scrubber media. Conductive elements may be configured to increase the amount of heating that his conducted to the scrubber media. In the case of active heating, an electrically resistive heating element is configured to heat the scrubber and/or scrubber media. Electrical current generated by the electrochemical cell may be passed through the electrically resistive heating element continuously or it may be turned on and off by a switch that is activated by the control system. Again, the control system may receive input values from one or more sensors that are used to activate the heating of the scrubber heater. In an exemplary embodiment, the electrochemical cell may be configured to run the airflow device even when the electrochemical cell is not operating to produce power, and thereby absorb moisture from the environment in the scrubber media which may be subsequently desorbed, or driven out of the scrubber media and into the electrochemical cell. For example, the control system may subsequently heat the scrubber media to drive off absorbed moisture from the scrubber media.

An exemplary scrubber comprises scrubber media that is reversible or irreversible. A reversible scrubber media may be reactivated by heating, for example, wherein the absorbed carbon dioxide is desorbed and driven off from the scrubber media. A reversible scrubber material may be reactivated by heating to about 70° C. or more, or about 90° C. or more. Therefore, a scrubber module that is configured to be heated to drive off absorbed moisture may also be reactivated when comprising a reversible scrubber media. When irreversible scrubber media reacts with the carbon dioxide it is changed chemically and is consumed. Scrubber media, irreversible or reversible, may be purged periodically to regulate the humidity level and in the case of reversible media, to drive off the absorbed carbon dioxide. A purge cycle may be run while a reversible scrubber media is heated to more effectively purge the desorbed carbon dioxide from the system. During a scrubber purge cycle, a flow of air through the scrubber may be reversed, wherein the air flow device, such as a fan, is reversed and therefore pushes air through the cell into the scrubber and out of the air inlet. In addition, the rate of flow of air through the scrubber may be increased, wherein the flow rate is higher, such as at least two times, three times, five times, ten times or more higher than a standard operational flow rate. This may be accomplished by increasing the fan speed, for example. In still another embodiment, a valve enables air to flow through the scrubber and then directly out of the outlet of the system without passing through the cell housing, and/or without passing by the HEM after it exits the scrubber.

A scrubber media may comprise media or material(s) selected from the group of: soda lime, sodium hydroxide, potassium hydroxide, and lithium hydroxide, lithium peroxide, calcium oxide, serpentinite, magnesium silicate, magnesium hydroxide, olivine, molecular sieves, amines, and monoethanolamine, and/or derivatives and/or combinations thereof. Amine scrubber media is reversible whereas soda lime is irreversible.

A scrubber configured to remove carbon dioxide from an air inflow to a metal-air electrochemical cell is described in U.S. patent application Ser. No. 15/077,341, to Fluidic Inc., filed on Mar. 22, 2016, entitled Water Management System In Electrochemical Cells with Vapor Return Comprising Air Electrodes and currently pending; the entirety of which is hereby incorporated by reference herein.

Various portions of the electrochemical cell 100 may be of any suitable structure or composition, including but not limited to being formed from plastic, metal, resin, or combinations thereof. Accordingly, the cell 100 may be assembled in any manner, including being formed from a plurality of elements, being integrally molded, or so on. In various embodiments the cell 100 and/or the housing 110 may include elements or arrangements from one or more of U.S. Pat. Nos. 8,168,337, 8,309,259, 8,491,763, 8,492,052, 8,659,268, 8,877,391, 8,895,197, 8,906,563, 8,911,910, 9,269,996, 9,269,998 and U.S. Patent Application Publication Nos. 20100316935, 20110070506, 20110250512, 20120015264, 20120068667, 20120202127, 20120321969, 20130095393, 20130115523, and 20130115525, each of which are incorporated herein in their entireties by reference.

FIG. 1 illustrates a schematic cross sectional view of an electrochemical cell 100. As shown, the components of the electrochemical cell 100 may be contained at least partially in an associated housing 110. The cell 100 utilizes a liquid ionically conductive medium 124, such as an electrolyte 126, that is contained within the housing 110, and is configured to circulate therein to conduct ions within the cell 100. While at times the ionically conductive medium may be generally stationary within the housing 110, such as in a stagnant zone, it may be appreciated that the cell 100 may be configured to create a convective flow of the ionically conductive medium. In some embodiments, the flow of the ionically conductive medium may be a convective flow generated by bubbles of evolved gas in the cell 100, such as is described in U.S. patent application Ser. No. 13/532,374 incorporated above in its entirety by reference.

Although in the illustrated embodiment of FIG. 1 the cell housing is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 2, another embodiment of the cell 100 (specifically, cell 100*) is presented, whereby an oxidant reduction electrode 150* defines a boundary wall for the cell chamber 120, and is sealed to a portion of a housing 110* so as to prevent or substantially prevent seepage of ionically conductive medium therebetween. In some cases, however, such a configuration is generally not preferred, however, due to concerns that a failure of the oxidant reduction electrode 150* would result in leakage of the ionically conductive medium out of the cell 100*. Regardless, in some such embodiments the convective flow of the ionically conductive medium in the cell chamber 120, described in greater detail below, may be in a direction upwards and away from the oxidant reduction electrode 150*, across the top of the fuel electrode 130.

As shown in FIG. 3, an exemplary electrochemical cell 100 has a scrubber module 60 that is detachably attachable to the cell housing 110. The scrubber module 60 may be detached from the electrochemical cell while the electrochemical cell is running. Since air is drawn in to the cell by an airflow device, removal of the scrubber module still allows air to enter into the inflow port 65. This allows for removal of the scrubber module for maintenance or replacement without interfering with the operation of the electrochemical cell. In normal operation with the scrubber attached, air is drawn in through the air intake 40, into the scrubber through the outflow port 61 and into the inlet port 62 of the scrubber 60. The air then exits the scrubber through the outlet port 64 of the scrubber 60 and enters back into the cell housing through the inflow port 65. Air passes from the air inflow port 65 into the air chamber of the oxidant reduction electrode (not shown). A cover 111 is configured over the top of the electrochemical cell housing 110, or over the cell manifold assembly 114. The cover and manifold assembly help to protect the cell components from the elements and keep dust, rain and other environmental elements out. An exhaust vent 45 is configured as an outlet for gas venting from the interior chamber of the cell.

Figure 4:
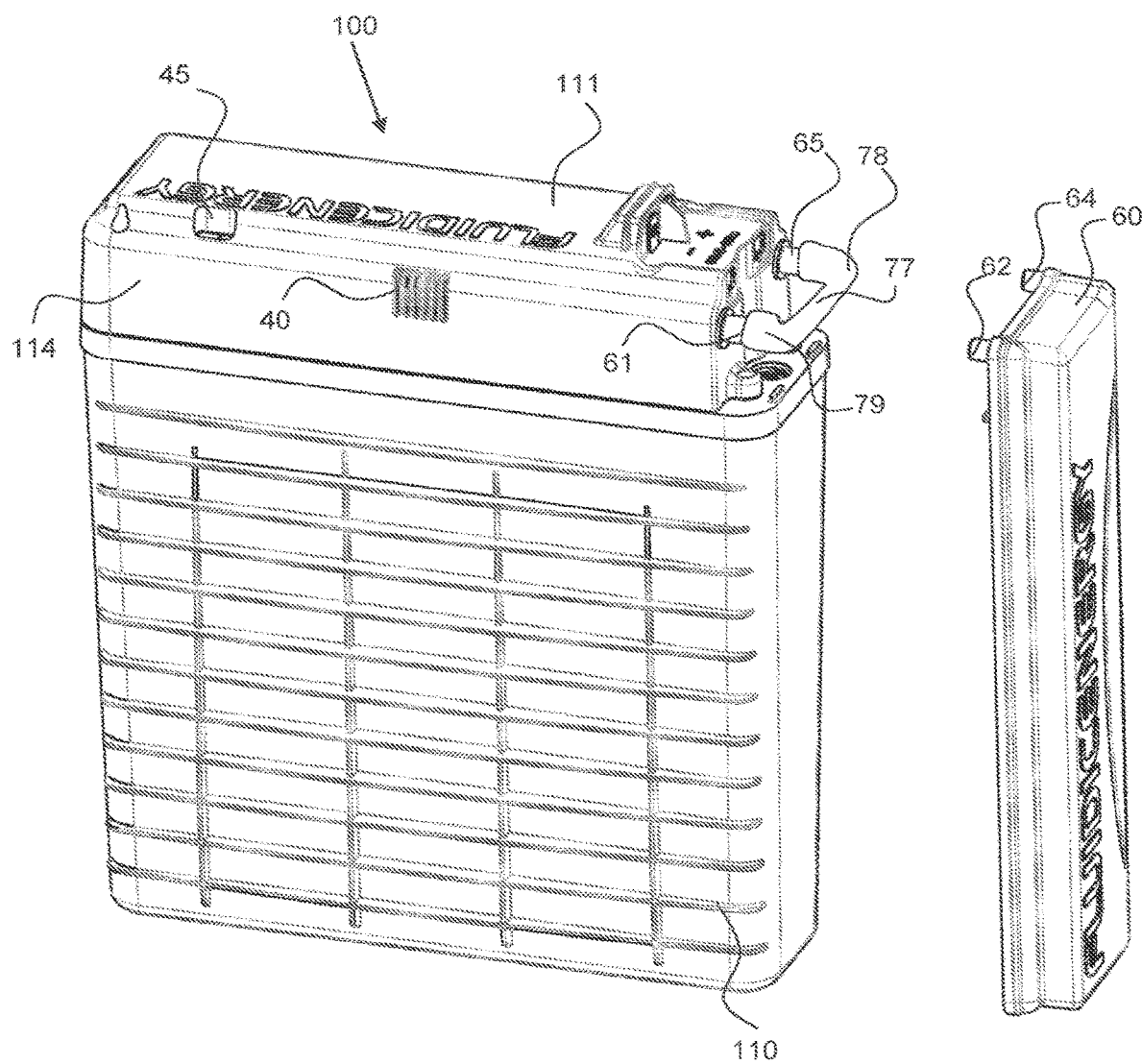
FIG. 4 shows a side view of an exemplary electrochemical cell having a scrubber module that is removed and a bypass adapter configured from the inflow port to the outflow port.
Figure 12:
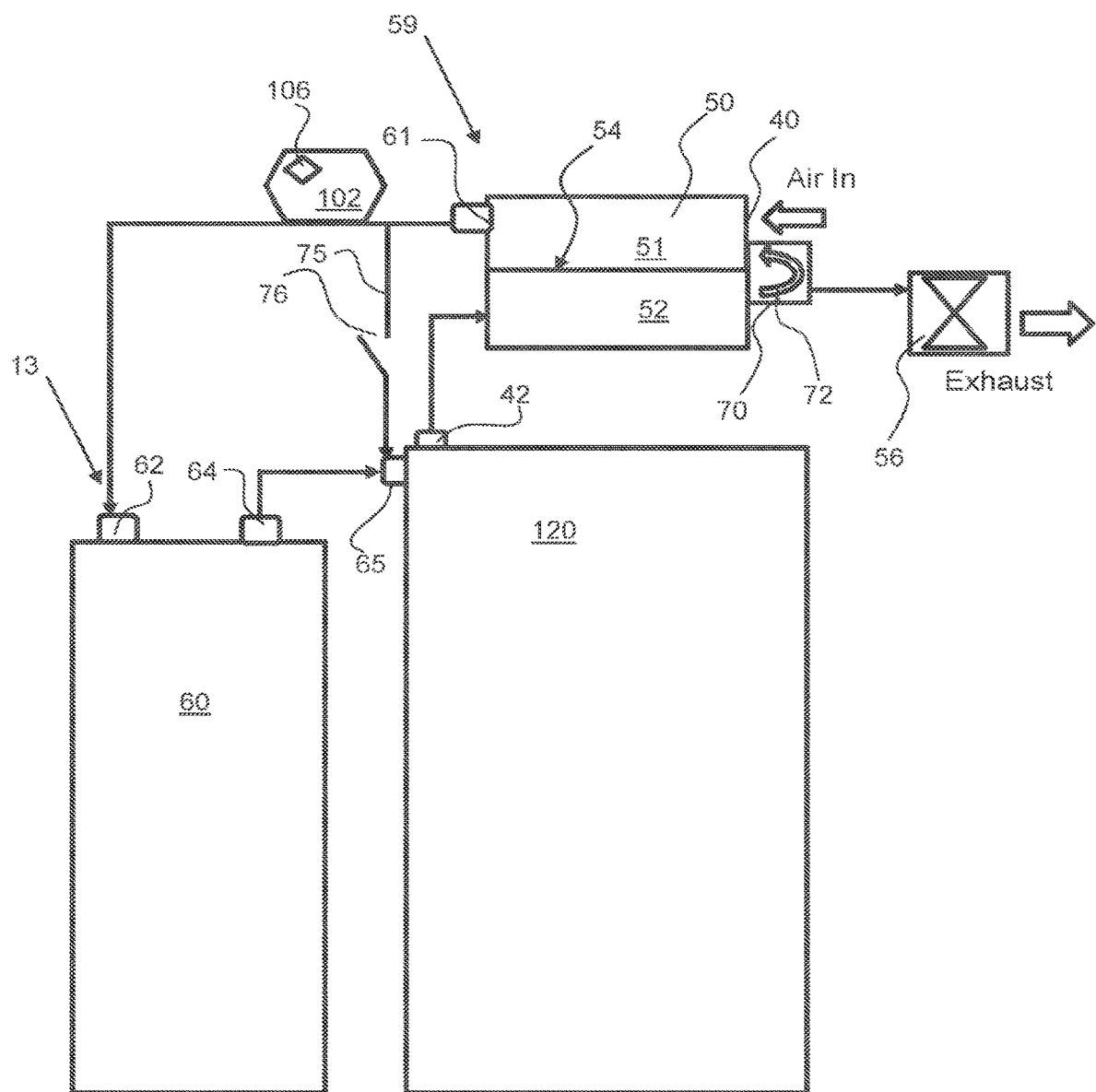
FIG. 12 shows a block diagram of a water management system.

As shown in FIG. 4, the scrubber module 60 is detached from the electrochemical cell 100 and a bypass adapter 77 extends from the outflow port 61 to the inflow port 65. Incoming airflow passes through the outflow port 61, into the outflow port end 79 of the bypass adapter, through the bypass adapter 77, out of the cell inflow end 78 of the bypass adapter and into the inflow port 65. The bypass adapter allows humid air inflow into the cell, when a HEM is utilized, while the scrubber is removed. The bypass adapter enables the cell to operate without the scrubber without any excessive moisture loss. The bypass adapter shown is a physical connector having an auxiliary conduit for passing inflow air into the inflow port. It is to be understood that this bypass flow may be accomplished through an inlet bypass conduit, configured as part of the cell, along with a valve to open flow up to an inlet bypass conduit, as shown in FIG. 12.

Figure 5:
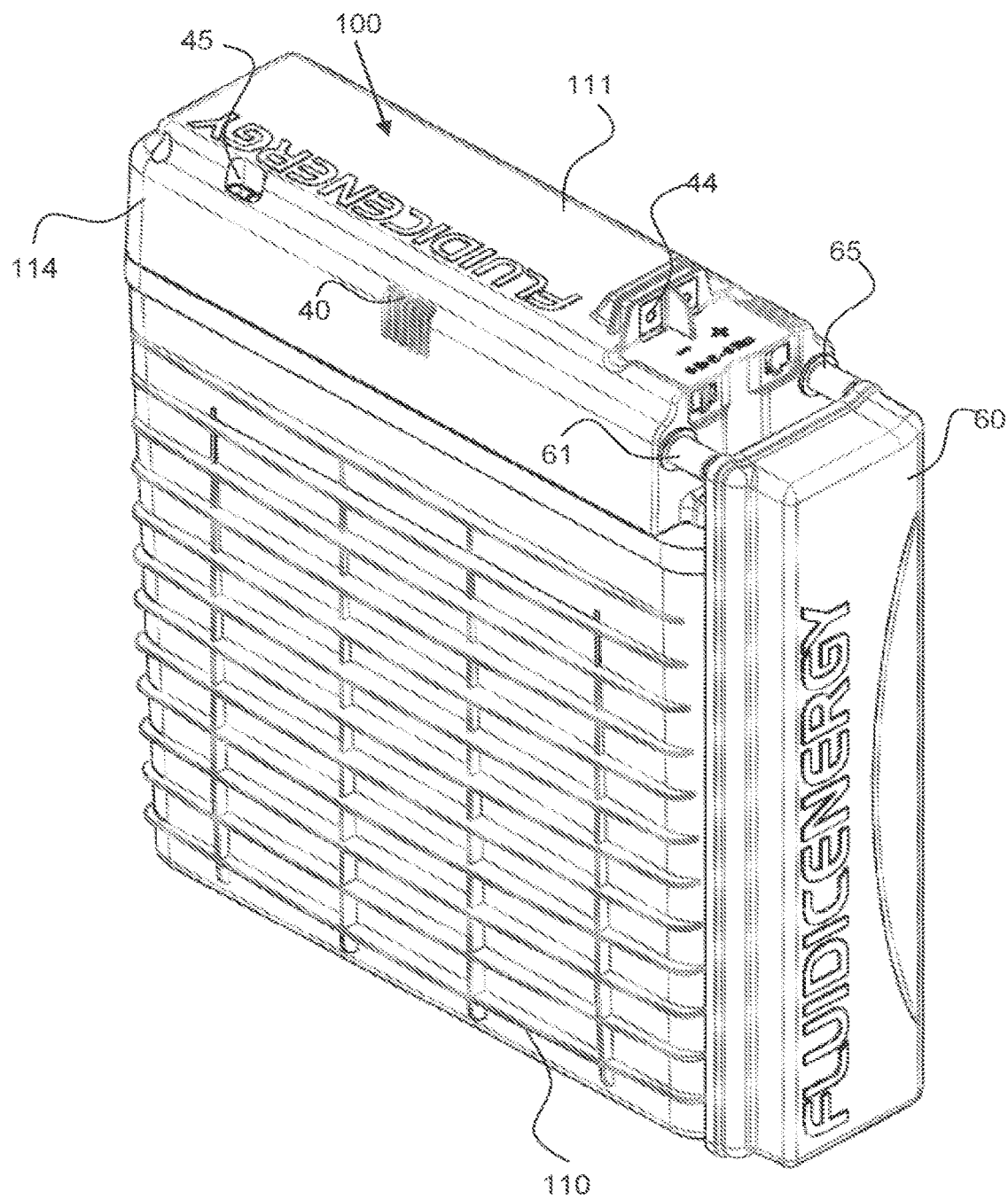
FIG. 5 shows a side view of an exemplary electrochemical cell having a scrubber module that is attached to the cell housing.

As shown in FIG. 5, the scrubber module 60 is attached to the outflow port 61 and inflow port 65 of the manifold assembly 114. The terminals of the cell 44 are shown extending from the manifold assembly 114.

Figure 6:
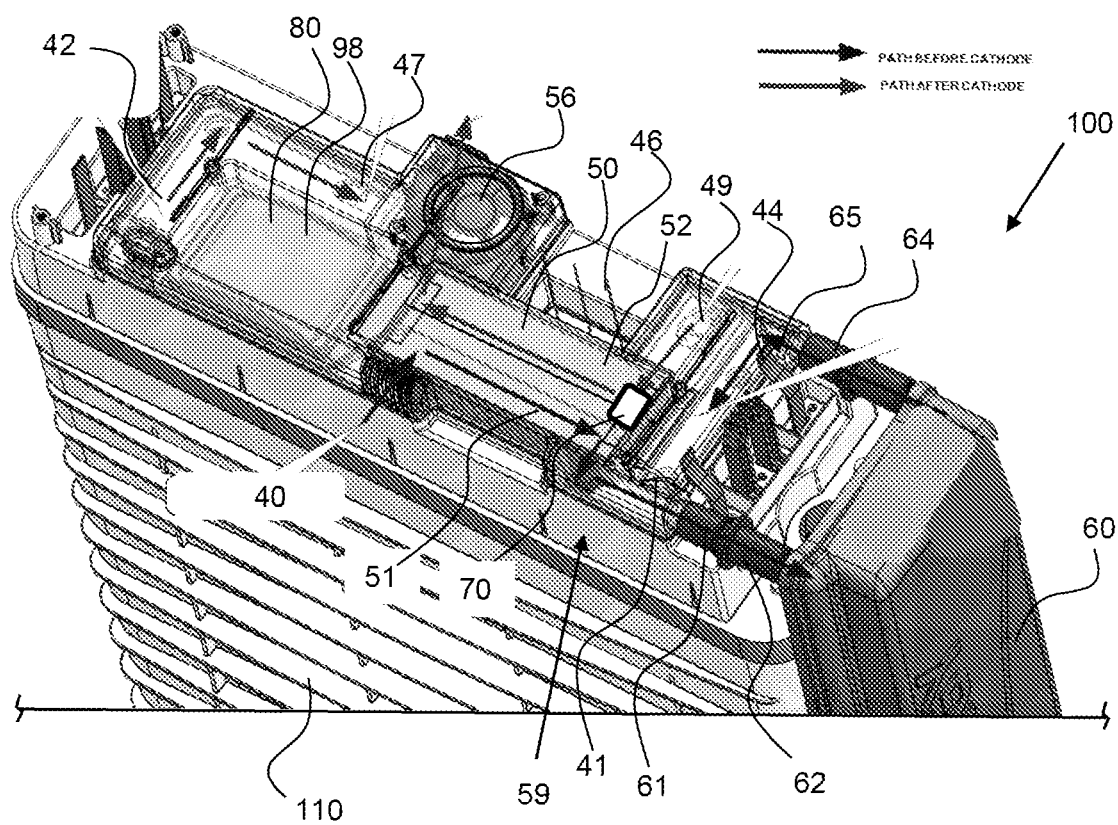
FIG. 6 shows a top view of an exemplary electrochemical cell having a moisture management system comprising a recirculation valve and scrubber.
Figure 7:
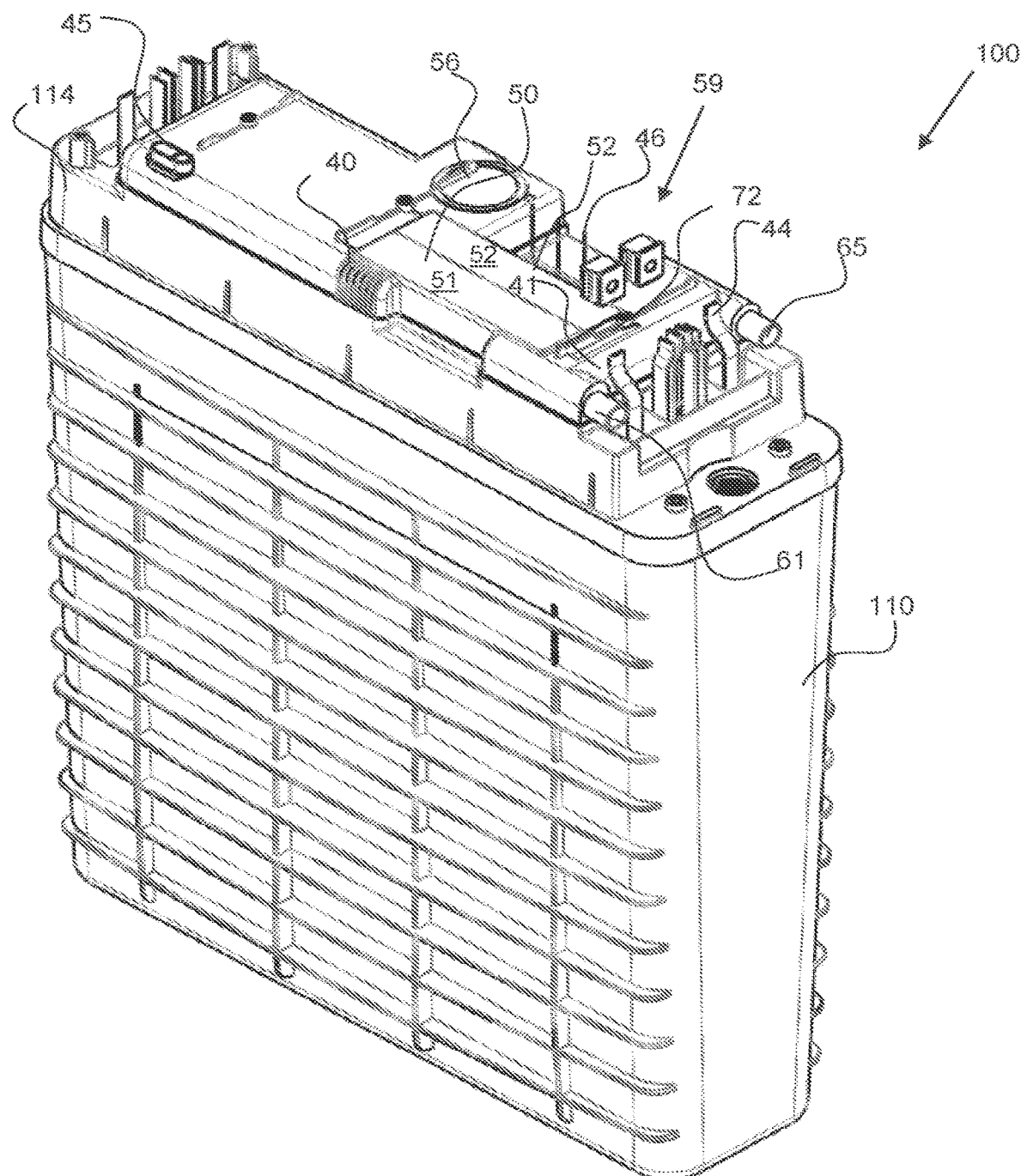
FIG. 7 shows a top perspective view of an exemplary electrochemical cell having a moisture management system.
Figure 8:
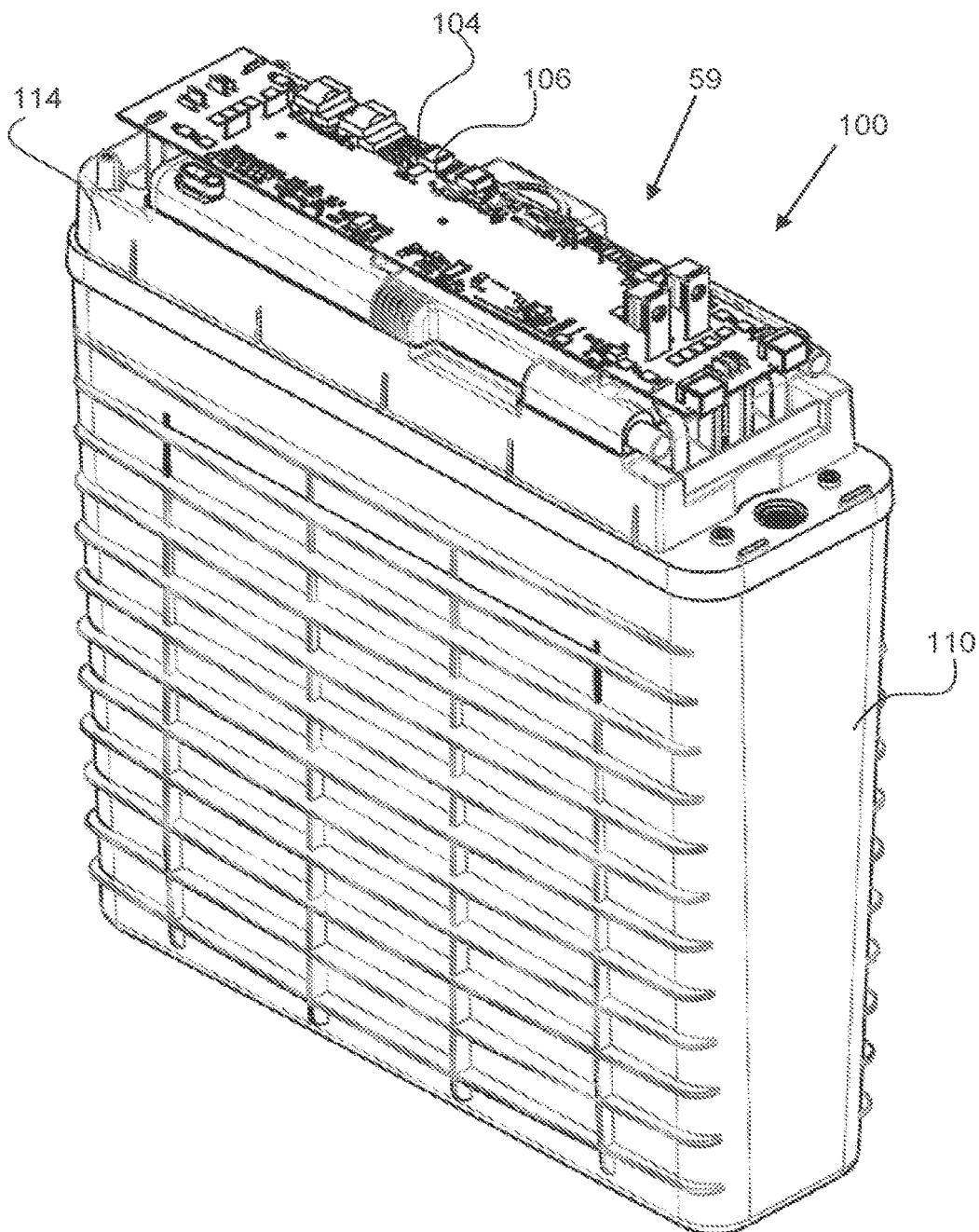
FIG. 8 shows a top perspective view of an exemplary electrochemical cell having a control system.

Referring now to FIGS. 6 to 8, an exemplary electrochemical cell 100 has a moisture management system 59 comprising a humidity exchange membrane module 50, recirculation feature 70, such as a valve or baffle, and scrubber 60. Ambient air enters the cell through the air intake 40 and is passed along the inflow side 51 of the HEM where it picks up moisture from the air flowing along the outflow side 52 of the HEM. The air then flows through the outflow port 61 and into the scrubber module 60 through the inlet port of the scrubber. The air then flows through the scrubber media, wherein carbon dioxide is removed from the airflow. The air then flows back into the cell housing 110 and into the cathode inlet 41, and subsequently into the oxidant reduction electrode air chamber. The air flows through the air chamber and out of the air chamber outlet 42, or cathode outlet, which is on an opposing end of the cell housing from the cathode inlet. The air then flows through an outflow bypass conduit that extends along the bottom of the manifold assembly 114. Air flows into the bypass inlet 47, through the outflow bypass conduit (not shown), and out of the bypass outlet 49. The airflow then flows over the outflow side 52 of the HEM. Some of the airflow may be diverted through a recirculation valve 70 back into the air inflow. The remainder of the air is drawn through the airflow device 56 and out of the cell housing. The cell terminals 44 are shown extending from the top of the cell housing 110. A plurality of sensor leads 46 are shown extending from the top of the electrochemical cell 100. As described herein, the sensor leads may measure the level of the electrolyte, and/or the humidity level of the air chamber. A control system 102, as shown in FIG. 8 may receive input from the sensor leads and open, close or adjust the amount of flow through the recirculation feature, or valve. The control system may change the amount of flow being drawn into the system and may draw air through the system even when the cell is not operating to produce power. The moisture in the air being drawn through the scrubber may be absorbed by the scrubber media and retained for later use, wherein the scrubber is heated either passively or actively by the system. The exemplary control system shown in FIG. 8 comprises a control circuit 104 and a microprocessor 106. The control system is configured on top of the manifold assembly 114 and a cover 111, as shown in FIG. 5, extends over the control system 102.

Figure 9:
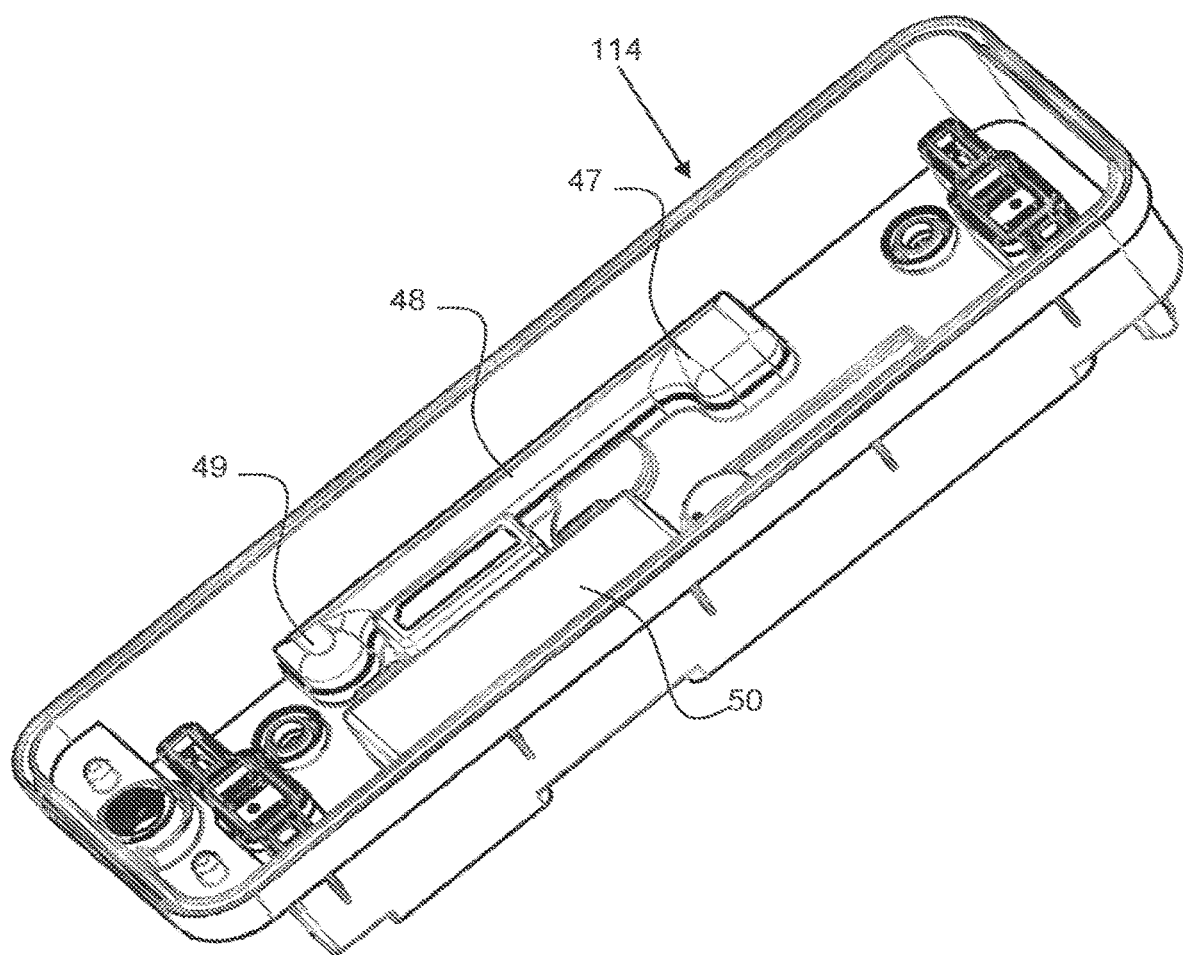
FIG. 9 shows an exemplary outflow bypass conduit within the manifold portion of the electrochemical cell.

As shown in FIG. 9, the outflow bypass conduit 48 extends under the manifold assembly 114. Air exiting the air chamber is diverted into the bypass inlet 47 and flows through the conduit to the bypass outlet 49. The air then flows into the HEM 50 or a portion is diverted into the inflow air through the recirculation feature. The air chamber extends across a portion of the length of the cell housing.

Figure 10:
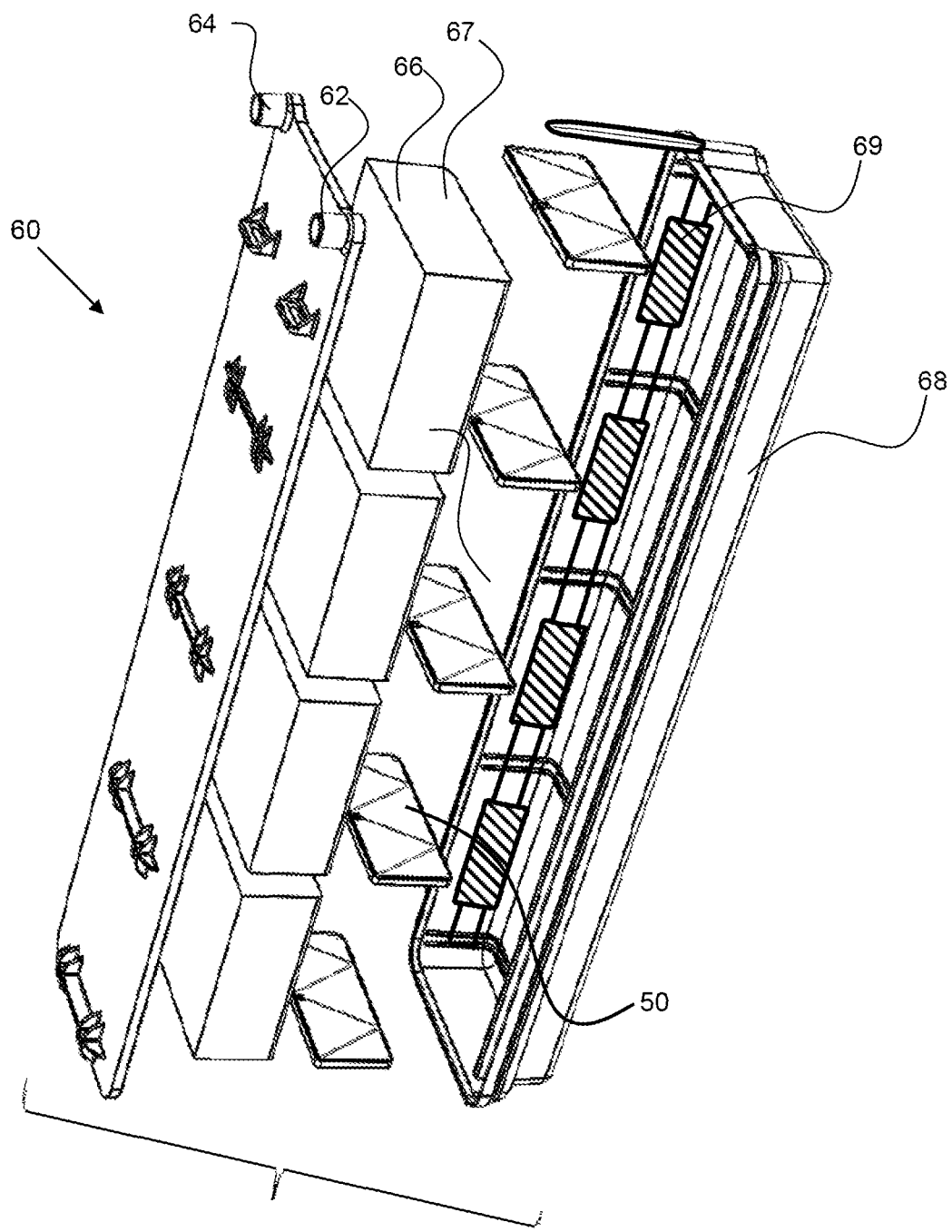
FIG. 10 shows an exploded view of an exemplary scrubber having a heating element.

As shown in FIG. 10, a scrubber module 60 may comprise a heating element 69 that is configured to be coupled with the control system to heat the scrubber media 66. The scrubber media as shown is a reversible scrubber media 67, a scrubber media that absorbs carbon dioxide that may be driven off by increasing the temperature of the reversible scrubber media. The heating element 69 extends within the scrubber module housing 68 to provide effective heating of the scrubber media, but may be configured on an exterior surface of the housing. A heater connector enables the heating element to be easily coupled with the control system when the scrubber module is attached to the cell housing. The control system may turn on the heating elements and control the valves within the electrochemical cell to control flow through the scrubber while being heated to effectively remove the carbon dioxide from the scrubber media.

Figure 11:
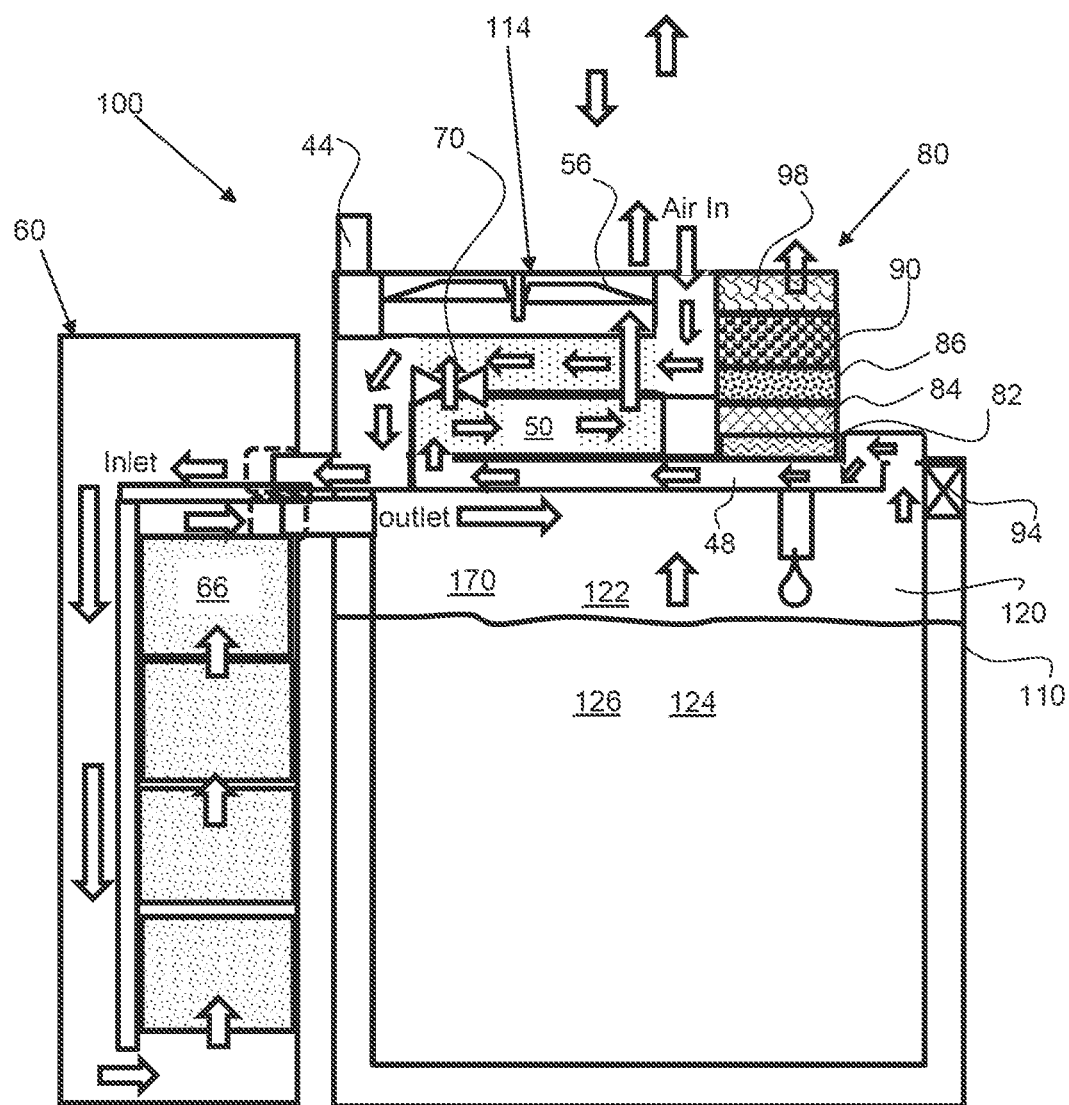
FIG. 11 shows a cross-sectional schematic of an exemplary electrochemical cell having a moisture and carbon dioxide management system.

As shown in FIG. 11, air flows into the manifold assembly 114 of the electrochemical cell 100, through the scrubber 60 and then into the air chamber 170. As shown, air enters the air chamber 170 configured within the interior chamber 122 of the cell housing 110. The air flows across the air chamber and exits the interior chamber where it enters the outflow bypass conduit 48. A pressure relief valve 94 is configured to vent pressure from within the cell chamber 120 when exceeding a threshold limit. Also shown in FIG. 11 is a mist elimination system 80 that is configured to reduce and/or eliminate mist that evolves from the surface of the electrolyte due to bubbling of gasses to the surface and to prevent or substantially prevent leakage of the electrolyte 126 in the event of an upset. The mist eliminator system comprises a safety vent 82 that is in communication with the interior chamber 122 of the cell housing 110, and therefore exposed to the ionically conductive medium 124 and/or gas space there above. An exemplary safety vent provides a tortuous conduit path that will slow the transfer of any liquid electrolyte to the downstream portions of the mist eliminator system. Another exemplary safety vent comprises a ball valve that allows air to go around the ball due to a pressure differential when upright, and when upset, seals when the ionically conductive media liquid forces the ball against a seat to prevent or substantially prevent liquid loss. A filter 84 is configured downstream of the safety vent and may be a concave filter that will drain absorbed ionically conductive medium back into the anode chamber, as described in U.S. Pat. No. 9,269,998, incorporated by reference herein.

The exemplary mist elimination system 80 comprises a hydrogen recombination portion 86, comprising a hydrogen recombination catalyst that reacts with any hydrogen to form water. The catalyst may be configured on a support material such as particles or surfaces of the mist elimination system that are exposed to the gas exiting the cell housing from the anode space. Air may enter in to the mist elimination system through the hydrophobic filter 98 to provide the necessary oxygen for the hydrogen recombination reaction. The hydrophobic filter may prevent or substantially prevent water ingress into the electrochemical cell.

The exemplary mist elimination system comprises a neutralizer portion 90 comprising a neutralizer media 91, such as an acid, configured to neutralize the ionically conductive medium. For example, the ionically conductive medium may comprise a potassium hydroxide solution that is caustic, and a neutralizer may be a solid acid or acid on carbon or some other support material. The neutralizer is configured to reduce any reactive gases that may exhaust from the anode chamber or the chamber containing the ionically conductive medium.

FIG. 12 shows a block diagram of an exemplary moisture (water) management system 59, and a carbon dioxide management system 13. The two systems may work in tandem to conserve moisture and provide a carbon dioxide depleted inflow stream to the electrochemical cell. The moisture management system increases the humidity of inflow air by drawing moisture from the outflow exhaust of the cell, which is typically warm and humid, when the cell is operating. The HEM module 50 has an inflow side 51 and an outflow side 52 separated by a HEM 54. The moisture level and carbon dioxide level of inflow air may further be adjusted by recirculating at least a portion of the outflow through a recirculation feature 70, such as a valve or baffle. As shown, the recirculation feature is upstream, prior to the inflow air reaching the HEM. Recirculated outflow will have a relative high moisture content and a lower carbon dioxide concentration than ambient air, in most cases. The moisture management system also incorporates a scrubber 60, wherein the scrubber media absorbs moisture from the air inflow. Scrubber media works more effectively when properly hydrated. In addition, the absorbed moisture in the scrubber media may be periodically desorbed and passed into the electrochemical cell chamber 120, and subsequently through the rest of the moisture management system. The moisture management system further comprises an inflow bypass conduit 75 and valve 76. The control system 102, comprising a microprocessor 106 may open and close valves, including the inflow bypass valve and or a recirculation valve 72 to efficiently operate the system and conserve moisture. For example, the scrubber may be detached and the controller may divert inflow air through the bypass conduit to the inflow port 65 of the cell chamber 120.

It will be apparent to those skilled in the art that various modifications, combinations and variations can be made in the present disclosure without departing from the spirit or scope of the disclosure. Specific embodiments, features and elements described herein may be modified, and/or combined in any suitable manner. Thus, it is intended that the present disclosure cover the modifications, combinations and variations of this disclosure provided they come within the scope of the appended claims and their equivalents.

What is claimed is:

1. An electrochemical cell comprising:
   a cell housing comprising:
      i) an air chamber;
      ii) an air chamber inflow port;
      iii) an air chamber outlet;
      iv) an electrolyte chamber for retaining a volume of an electrolyte;
   an oxidant reduction electrode for reducing a gaseous oxidant configured between the air chamber and the electrolyte chamber;
   a fuel electrode;
      wherein a fuel is reacted at the fuel electrode and wherein the fuel electrode is positioned apart from the oxidant reduction electrode, thereby defining a gap, and wherein said electrolyte is in the gap;
   a scrubber module comprising an enclosure comprising:
      i) a scrubber media;
      ii) a scrubber inlet port configured to couple with an inlet air outflow port; and
      iii) a scrubber outlet port configured to couple with the air chamber inflow port;
   wherein the scrubber module is detachably attachable to said cell housing, and whereby the electrochemical cell operates when the scrubber module is removed, and a recirculation feature that transfers a portion of exhaust airflow to the inlet airflow,
   whereby at least a portion of an exhaust airflow from said air chamber is transferred through said recirculation feature into the inlet airflow.

2. The electrochemical cell of claim 1, wherein the electrolyte is an ionically conductive liquid electrolyte.

3. The electrochemical cell of claim 2, wherein the fuel electrode comprises a metal fuel and is configured at least partially within the electrolyte wherein the fuel electrode is positioned apart from the oxidant reduction electrode, thereby defining a gap, and wherein said ionically conductive liquid electrolyte is in the gap.

4. The electrochemical cell of claim 1, wherein a flow of air entering the cell housing through the air chamber inflow port and from the scrubber module has less carbon dioxide than a flow of air entering the scrubber module through the outflow port from the cell housing.

5. The electrochemical cell of claim 1, wherein the scrubber media is irreversible scrubber media.

6. The electrochemical cell of claim 5, wherein the irreversible scrubber media is selected from the group of consisting of: soda lime, sodium hydroxide, potassium hydroxide, and lithium hydroxide, lithium peroxide, calcium oxide, calcium carbonate, serpentinite, magnesium silicate, magnesium hydroxide, olivine, molecular sieves, amines, and monoethanolamine, and/or derivatives and/or combinations thereof.

7. The electrochemical cell of claim 1, wherein the scrubber media comprises a reversible scrubber media.

8. The electrochemical cell of claim 7, wherein the reversible scrubber media comprises amine groups.

9. The electrochemical cell of claim 1, wherein the scrubber module comprises a heating element.

10. The electrochemical cell of claim 9, wherein the heating element is a passive heating element that directs heat from the electrochemical cell to the scrubber media.

11. The electrochemical cell of claim 9, wherein the heating element comprises an electric heating element that is controlled by a control system comprising a microprocessor.

12. The electrochemical cell of claim 1, wherein the housing comprises a humidity exchange module comprising:
   a) a humidity exchange membrane configured between the inlet airflow to the cell housing and an exhaust airflow received from the air chamber;
   wherein the humidity exchange membrane comprises an inflow side exposed to the inlet airflow and an outflow side exposed to the exhaust airflow; and
   wherein the exhaust airflow comprises moisture and wherein said moisture is transferred through said humidity exchange membrane to the inlet airflow.

13. The electrochemical cell of claim 12, wherein the humidity exchange membrane comprises an ionically conductive polymer or a perfluorosulfonic acid polymer.

14. The electrochemical cell of claim 12, wherein the inlet airflow flows into the scrubber module after passing through the humidity exchange module.

15. The electrochemical cell of claim 1, wherein the recirculation feature is a valve and wherein the valve is controlled by the control system.

16. The electrochemical cell of claim 1, wherein the recirculation feature is a baffle and wherein the baffle is passively controlled by a pressure differential between the exhaust airflow and the inlet airflow.

17. The electrochemical cell of claim 1, wherein recirculation feature is configured upstream of the humidity exchange membrane module, wherein a portion of the exhaust airflow is recirculated into the inlet airflow after passing through the humidity exchange module.

18. The electrochemical cell of claim 12, comprising an airflow device configured to expel exhaust airflow from the cell housing;
   wherein the airflow device creates a reduced pressure within the cell housing that draws the inlet airflow into the cell housing, through the inflow side of the humidity exchange membrane module, through the scrubber module, through the air chamber and through the outflow side of the humidity exchange membrane module.

19. The electrochemical cell of claim 12, wherein the reduced pressure within the cell housing by drawing a flow of ambient airflow through the inflow port to the scrubber module when the scrubber is detached from the electrochemical cell.

20. The electrochemical cell of claim 1, further comprising an inflow bypass valve and inflow bypass conduit, wherein the inflow bypass conduit diverts inlet airflow to the cell chamber without passing through the scrubber module.

21. The electrochemical cell of claim 20, wherein the inflow bypass valve is controlled by the control system.

22. An electrochemical cell comprising:
a cell housing comprising:
v) an air chamber;
vi) an air chamber inflow port;
vii) an air chamber outlet;
viii) an electrolyte chamber for retaining a volume of an electrolyte;
an oxidant reduction electrode for reducing a gaseous oxidant configured between the air chamber and the electrolyte chamber;
a fuel electrode;
wherein a fuel is reacted at the fuel electrode and wherein the fuel electrode is positioned apart from the oxidant reduction electrode, thereby defining a gap, and wherein said electrolyte is in the gap;
a scrubber module comprising an enclosure comprising:
i) a scrubber media;
ii) a scrubber inlet port configured to couple with an inlet air outflow port; and
iii) a scrubber outlet port configured to couple with the air chamber inflow port;
wherein the scrubber module is detachably attachable to said cell housing, and whereby the electrochemical cell operates when the scrubber module is removed, and further comprising a bypass adapter that comprises a conduit that couples the outflow port to the inflow port, wherein the bypass adapter diverts inlet airflow to the cell chamber without passing through the scrubber module.

* * * * *